United States Patent
Fruge et al.

(10) Patent No.: US 6,903,903 B1
(45) Date of Patent: Jun. 7, 2005

(54) DISK DRIVE HEAD STACK ASSEMBLY HAVING A TAPERED PIVOT BEARING

(75) Inventors: Tave J. Fruge, Louisville, CO (US); James A. Dunckley, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/412,884

(22) Filed: Apr. 14, 2003

Related U.S. Application Data

(63) Continuation-in-part of application No. 09/354,400, filed on Jul. 15, 1999, now abandoned.

(51) Int. Cl.$^7$ .............................................. G11B 21/08
(52) U.S. Cl. ................................................... 360/265.7
(58) Field of Search ............................. 360/254.6, 240, 360/265.7, 266.1, 265.6

(56) References Cited

U.S. PATENT DOCUMENTS

| | | | |
|---|---|---|---|
| 3,973,273 A | 8/1976 | Lissner et al. ................. | 360/98 |
| 4,899,237 A | 2/1990 | Tochiyama et al. ....... | 360/98.02 |
| 4,900,958 A | 2/1990 | Kitahara et al. .......... | 310/67 R |
| 5,097,588 A | 3/1992 | Fird et al. ..................... | 29/603 |
| 5,143,459 A | 9/1992 | Plutt .......................... | 384/537 |
| 5,650,896 A | 7/1997 | Viskochil .................... | 360/106 |
| 5,654,597 A | 8/1997 | Sakashita et al. ............. | 310/51 |
| 5,666,243 A | 9/1997 | Brent ....................... | 360/265.7 |
| 5,801,901 A | 9/1998 | Bryan et al. ............. | 360/98.08 |
| 5,999,373 A | * 12/1999 | Allsup et al. ............ | 360/265.6 |
| 6,299,358 B1 | * 10/2001 | Prater et al. ................ | 384/537 |

\* cited by examiner

*Primary Examiner*—George J. Letscher
(74) *Attorney, Agent, or Firm*—Marsh Fischmann & Breyfogle LLP

(57) ABSTRACT

A disk drive head stack assembly (66) of a configuration that facilitates the assembly thereof is disclosed. One or more head/arm assemblies (74) are mounted on a pivot bearing (118). This pivot bearing (118) includes a tapered section (126). Each head/arm assembly (74) may be mounted on the pivot bearing (118). Thereafter, a retainer ring (102) may be advanced relative to the pivot bearing (118). Advancement of the retainer ring (102) along the tapered section (126) expands the retainer ring (102) so that the same may be disposed within a retainer ring slot (130) of the pivot bearing (118). Each head/arm assembly (74) is maintained between this retainer ring (102) and a flange (134) of the pivot bearing (118).

22 Claims, 7 Drawing Sheets

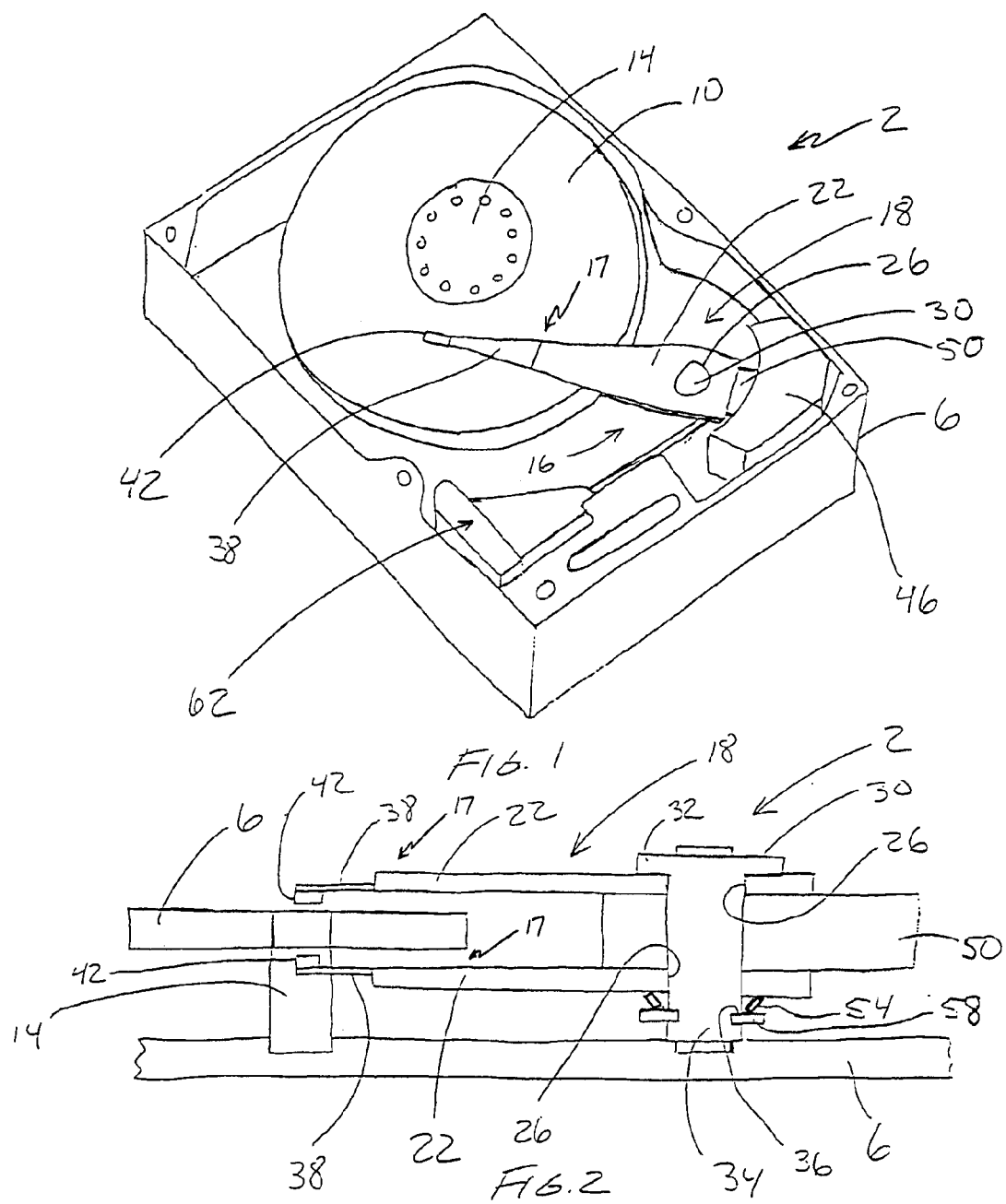

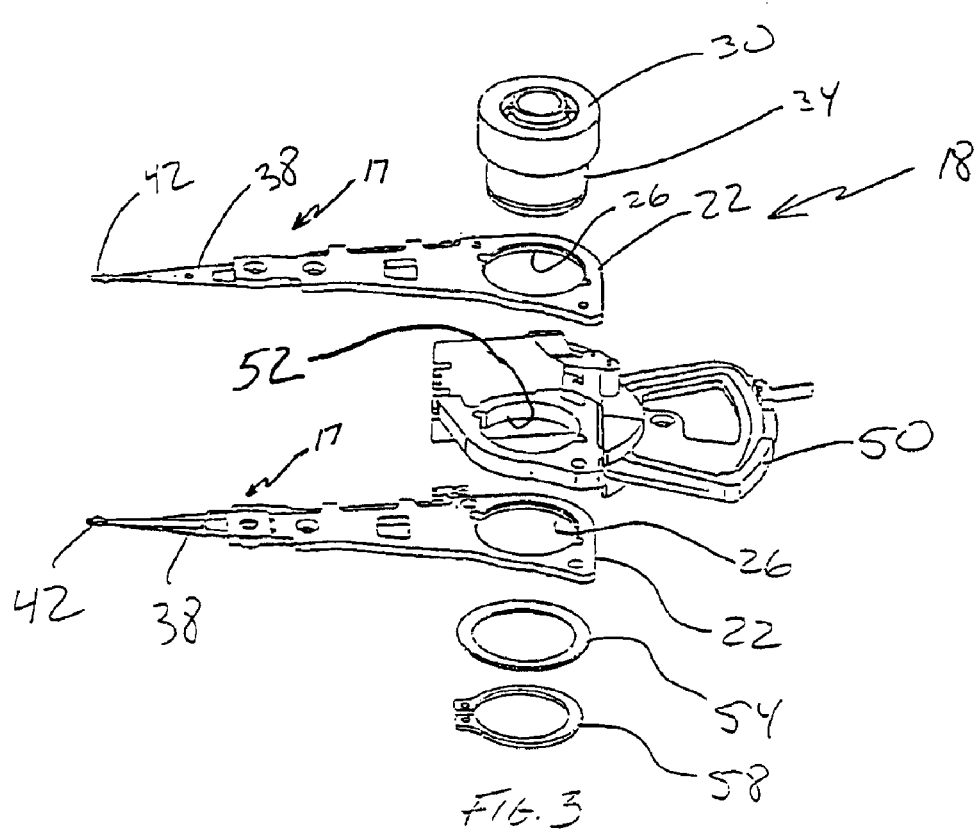
FIG. 3
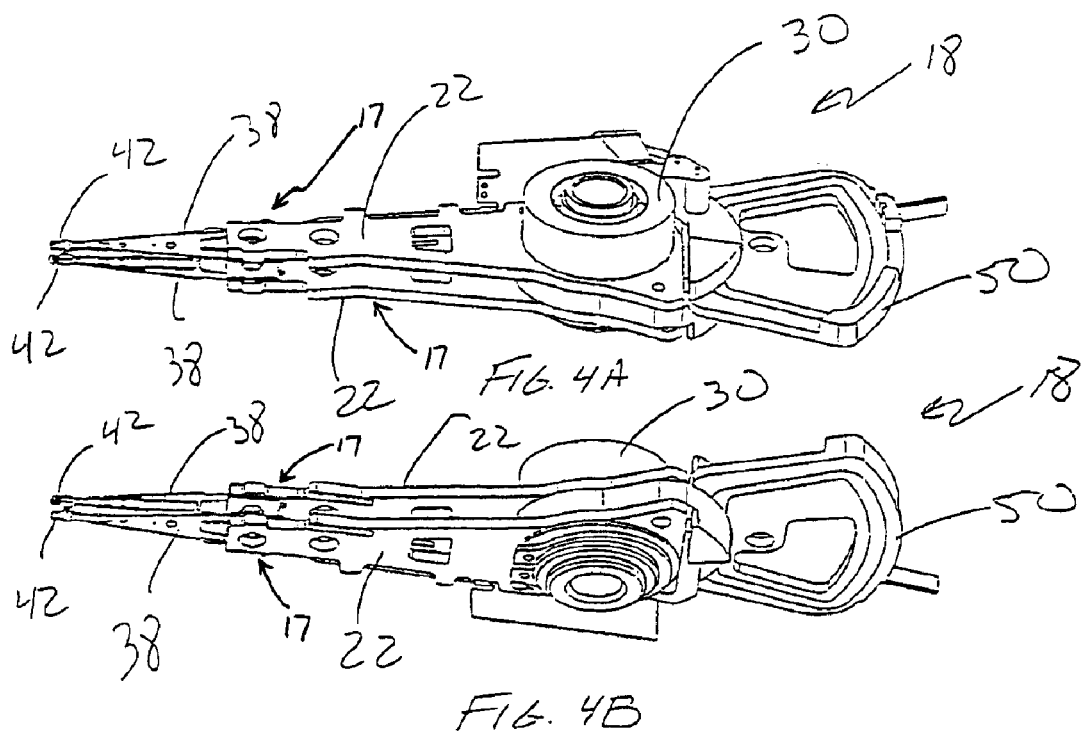
FIG. 4A
FIG. 4B

DISK DRIVE HEAD STACK ASSEMBLY HAVING A TAPERED PIVOT BEARING

CROSS REFERENCE TO RELATED APPLICATIONS

This patent application is a continuation-in-part of, and claims priority under 35 U.S.C. §120 to, U.S. patent application Ser. No. 09/354,400, that is entitled "ACTUATOR ARM ASSEMBLY STACK COMPRESSED WITH SPRING WASHER," that was filed on Jul. 15, 1999, now abandoned and the entire disclosure of which is incorporated by reference in its entirety herein.

FIELD OF THE INVENTION

The present invention generally relates to disk drives and, more particularly, to using at least one retainer ring to at least generally assist in maintaining an association of at least one head/arm assembly and a pivot bearing during disk drive operations (e.g., read and/or write operations).

BACKGROUND OF THE INVENTION

Disk drive systems have undergone significant evolution in a relatively short time. Current designs often have a plurality of disks maintained in a common stack, along with a head stack assembly that may include a unitary, rigid actuator arm body (e.g., "E" block) having a plurality of rigid, non-deflectable, vertically spaced actuator arms or tips on which a plurality of flexible suspensions or load beams are fixedly mounted (e.g., via staking). Heads are mounted on the individual load beams and read/write information from the plurality of disks, with two load beams extending into the space between adjacent disks.

Each disk includes a plurality of tracks which are concentrically disposed about an axis about which the plurality of disks rotate. Information may be stored in each of these tracks. Access to other tracks, and thereby other data storage areas on a disk, is provided by moving (e.g., pivoting) the actuator body via a voice coil motor or the like to simultaneously move all load beams and their corresponding heads to a different radial position relative to their corresponding disk. There is at least one known disk drive design which is admitted to be prior art which mounts a plurality of individual actuator arms on a bearing hub, and which clamps these individual actuator arms together and maintains the same in a certain fixed positional relation by a threaded interconnection. Specifically, an external portion of the bearing hub is threaded and a nut is engaged therewith to clamp the actuator arms "down" onto the bearing hub.

Both of the above-noted designs suffer from a number of disadvantages in at least some respect. Solid actuator bodies with load beams separately attached thereto can be relatively costly to fabricate, assemble, test, and rework. Threaded interconnections increase the potential for the generation of particulates within the disk drive encasement which can adversely affect one or more aspects of its operation. Therefore, it would be desirable to have a more cost effective approach for assembling a head stack assembly which avoided particulate generation, particularly for the "low end" disk drive market.

Retainer rings have been used to mount a head/arm assembly on a pivot bearing. In this regard, the head/arm assembly is mounted on the pivot bearing so as to be located between a flange of the pivot bearing and a retainer ring slot that is formed on an outer wall of the pivot bearing. A frustumly-shaped arbor is disposed against the end of the pivot bearing to allow a retainer ring to be mounted on the outer wall of the pivot bearing. Advancing the retainer ring relative to the arbor expands the same to a sufficient diameter so as to be able to be disposed on the outer wall of the pivot bearing. Once on the outer wall of the pivot bearing, the retainer ring is advanced along a constant diameter portion of the pivot bearing until it "snaps" into the retainer ring slot. This approach provides at least certain advantages in the assembly of a head stack assembly. However, it still requires additional tooling.

BRIEF SUMMARY THE INVENTION

The present invention generally relates to the assembly of a head stack assembly for disk drives. More specifically, the present invention generally relates to the manner in which one or more head/arm assemblies are mounted on a pivot bearing.

A first aspect of the present invention generally relates to a method for assembling a disk drive head stack assembly. A first actuator arm is mounted on an outer wall of the pivot bearing. A retainer ring, clip, or the like is used to mount the first actuator arm on the pivot bearing. In this regard, the retainer ring is disposed against a portion of the outer wall of the pivot bearing. The retainer ring is advanced relative to the pivot bearing in a direction of a retainer ring slot or groove formed on the outer wall of the pivot bearing. At least a portion of this advancement expands the retainer ring by its continued engagement with the pivot bearing to facilitate the disposition of the retainer ring within the retainer ring slot formed on the outer wall of the pivot bearing.

Various refinements exist of the features noted in relation to the first aspect of the present invention. Further features may also be incorporated in the first aspect of the present invention as well. These refinements and additional features may exist individually or in any combination. The head stack assembly associated with the first aspect may include a single actuator arm. Multiple individual actuator arms may be secured to the pivot bearing in accordance with the first aspect of as well. Each actuator arm may be part of the head/arm assembly that includes a rigid actuator arm, a flexible suspension, and a head (e.g., a slider and one or more transducers) that is appropriately mounted on the suspension.

Only relative movement is required between the retainer ring and the pivot bearing in case of the first aspect. Typically the pivot bearing will remain stationary, while the retainer ring is advanced. In any case, the movement of the retainer ring relative to the pivot bearing in accordance with the first aspect may be along a direction that is at least generally parallel with a rotational axis associated with the pivot bearing. The expansion of the retainer ring need not, but may, occur over the entire time that the retainer ring is advanced relative to the pivot bearing, during its engagement with the pivot bearing, so as to direct the retainer ring within the retainer ring slot. In one embodiment, the retainer ring engages a short cylindrical section of the outer wall of the pivot bearing immediately prior to being directed within the retainer ring slot. Continued movement of the retainer ring along the outer wall of the pivot bearing would thereby not further expand the retainer ring when engaged with this cylindrical section. In another embodiment, the retainer ring expands by its engagement with the outer wall of the pivot bearing until being directed within the retainer ring slot. Movement of the retainer ring into the retainer ring slot on the outer wall of the pivot bearing may be provided by the elastic forces that are stored within the retainer ring while being expanded in accordance with this first aspect. Preferably, the retainer ring exerts a contractive force on the pivot bearing after being disposed within its retainer ring slot.

The retainer ring may be initially mounted on the outer wall of the pivot bearing without having to substantially increase the size thereof in the case of the first aspect. In one embodiment, the size of the retainer ring need not be increased at all to initially dispose the retainer ring on the outer wall of the pivot bearing and so as to be in interfacing relation therewith. No separate tooling is thereby required to initially position the retainer ring on the outer wall of the pivot bearing. Stated another way, the retainer ring may be manipulated solely by hand to dispose the retainer ring on the outer wall of the pivot bearing. Stated yet another way, the inner diameter of the retainer ring in an undeformed state is larger than an outer diameter of a portion of the outer wall of the pivot bearing to initially position the retainer ring on the outer wall for subsequent expansion of the retainer ring in one embodiment of the first aspect. It should be appreciated that an appropriate pliers could be used to increase the inner diameter of the retainer ring to initially dispose the same on the outer wall of the pivot bearing, and thereafter the retainer ring could be expanded in accordance with the first aspect. In any case, once the retainer ring is initially on the outer wall of the pivot bearing, the size of the retainer ring is increased by at least about 8% in one embodiment, and by at least about 10% in another embodiment, prior to being disposed within the retainer ring slot. This also may be done solely by hand. Expansion of the retainer ring in accordance with the first aspect preferably does not exceed the elastic limit of the retainer ring or "over stretch" the retainer ring by an amount that would adversely affect its ability to be retained within the retainer ring slot.

There are a number of ways in which the expansion of the retainer ring may be described in the case of the first aspect. One is that the effective diameter of the retainer ring is increased during at least a portion of the time that the retainer ring is relatively advanced toward the retainer ring slot on the outer wall of the pivot bearing. In one embodiment, the retainer ring has a pair of ends that are spaced apart when the retainer ring is in a neutral or static state (e.g., in a non-distorted shape). The expansion of the retainer ring by the pivot bearing may include increasing the spacing between this pair of ends during at least a portion of the time that the retainer ring is being relatively advanced toward the retainer ring slot on the outer wall of the pivot bearing. Preferably the retainer ring is arcuately shaped between its pair of ends to enhance its interface with the outer wall of the pivot bearing.

One or more individual actuator arms may be disposed between the retainer ring and another appropriate stop associated with the pivot bearing in the case of the first aspect. This "second" stop may be in the form of another retainer ring, although typically it will be in the form of a flange that is part of the pivot bearing. In any case, biasing forces may be exerted on each actuator arm that is located between the retainer ring and the second stop associated with the pivot bearing. These biasing forces may compress the actuator arm(s) between the retainer ring and the second stop associated with the pivot bearing. Biasing forces may be provided by disposing one more springs or other appropriate biasing members (e.g., an elastomer), somewhere between the retainer ring and the second stop associated with the pivot bearing. A preferred biasing member is a Belleville spring. In one embodiment, such a Belleville spring is seated against the retainer ring and biases the actuator arm(s) toward the second stop associated with the pivot bearing. Such a Belleville spring can also be seated against the second stop associated with the pivot bearing to direct the actuator arm(s) toward the retainer ring. At least one Belleville spring could be disposed on each side of what may be characterized as an actuator arm stack so as to place the same in compression or in at least somewhat of a compressive state.

A second aspect of the present invention is directed to a disk drive head stack assembly. This head stack assembly generally includes at least one head/arm assembly that is mounted on a pivot bearing. This pivot bearing includes an inner bearing member and an outer bearing member that are able to rotate relative to each other. An outer wall or surface of the outer bearing member includes a section that is tapered between first and second locations along a length dimension of the outer wall of the pivot bearing. The outer bearing member is larger at the second location than at the first location, and the second location is disposed somewhere between the first location and a retainer ring slot that is formed on and disposed about at least a portion of an outer wall of the outer bearing member. A retainer ring is disposed in this retainer ring slot to retain each head/arm assembly of the head stack assembly between the retainer ring and a second stop associated with the outer bearing member.

Various refinements exist of the features noted in relation to the second aspect of the present invention. Further features may also be incorporated in the second aspect of the present invention as well. These refinements and additional features may exist individually or in any combination. The head stack assembly associated with the second aspect may include a single head/arm assembly. Multiple head/arm assemblies may be mounted on the pivot bearing in accordance with the second aspect of as well. Each head/arm assembly may include a rigid actuator arm, a flexible suspension, and a head (e.g., a slider and one or more transducers) that is appropriately mounted on the suspension.

The retainer ring slot associated with the pivot bearing of the second aspect may be annular. The retainer ring that is disposed within this retainer ring slot will typically extend about less than, an entire annular portion of the outer wall of the outer bearing member. For instance, the retainer ring may include a pair of ends that are disposed in spaced relation when the retainer ring is disposed within the retainer ring slot. Preferably the retainer ring is arcuately shaped between this pair of ends to enhance its interface with the outer wall of the pivot bearing within the retainer ring slot. Other configurations may be appropriate for the retainer ring.

The second stop associated with the outer bearing member of the pivot bearing utilized by the second aspect may be in the form of an annular flange that is part of the outer bearing member. However, the second stop could also be in the form of a second retainer ring that is disposed within a second retainer ring slot formed on the outer wall of the outer bearing member.

Biasing forces may be exerted on any head/arm assembly disposed between the retainer ring and the second stop associated with the pivot bearing in the case of the second aspect. These biasing forces may place any head/arm assembly located between the retainer ring and the second stop associated with the pivot bearing in compression or in at least somewhat of a compressive state. Biasing forces may be provided by disposing one more springs or other appropriate biasing members (e.g., an elastomer) somewhere between the retainer ring and the second stop associated with the pivot bearing. A preferred biasing member is a Belleville spring. In one embodiment, such a Belleville spring is seated against the retainer ring and biases each head/arm assembly toward the second stop associated with the pivot bearing. Such a Belleville spring can also be seated against the second stop associated with the pivot bearing to direct each head/arm assembly toward the retainer ring. At least one Belleville spring could be disposed on each side of what may be characterized as a head/arm assembly stack so as to place the same in at least somewhat of a compressive state.

The tapered section of the outer wall of the outer bearing member in the case of the second aspect may assume a variety of configurations that will function to increase the effective diameter of the retainer ring by its engagement with the outer wall of the outer bearing member as the retainer ring is relatively advanced toward the retainer ring slot. One embodiment of the tapered section utilizes a constant slope. The magnitude of this slope is at least about 0.1 in one embodiment, is at least about 0.2 in another embodiment, and is at least about 0.3 in yet another embodiment. Another related characterization of the tapered section is in terms of an expansion ratio. The "expansion ratio" is a ratio of the amount that the retainer ring expands by moving along the tapered section (e.g., "expansion" being in a direction that is perpendicular to a rotational axis of the pivot bearing), to the distance that the retainer ring has advanced along the tapered section in a direction that is perpendicular to the direction of the expansion (e.g., in a direction that is parallel with the rotational axis of the pivot bearing). This expansion ratio is at least about 0.2 in one embodiment, is at least about 0.4 in another embodiment, and is at least about 0.6 in yet another embodiment (e.g., twice the slope of the tapered section).

Another embodiment of the second aspect has the tapered section of the outer wall of the pivot bearing with an arcuate shape progressing from the first location to the second location. Any configuration may be utilized for the tapered section that will increase the effective diameter of the retainer ring by its engagement with the tapered section as the retainer ring is relatively advanced toward the retainer ring slot along the tapered section from the first location to the second location.

The retainer ring may be initially mounted on the tapered section of the pivot bearing without having to substantially increase the size thereof in the case of the second aspect. In one embodiment, the size of the retainer ring need not be increased at all to initially dispose the retainer ring on the tapered section of the pivot bearing and so as to be in interfacing relation therewith. No separate tooling is thereby required to initially position the retainer ring on the outer wall of the pivot bearing. Stated another way, the retainer ring may be manipulated solely by hand to dispose the retainer ring on the outer wall of the pivot bearing. Stated yet another way, the inner diameter of the retainer ring in an undeformed state is larger than an outer diameter of a portion of the tapered section of the pivot bearing on which the retainer ring may be initially disposed in one embodiment. Preferably the inner diameter of the retainer ring may be disposed on the tapered section (at the first location or somewhere between the first and second locations) without having to increase its inner diameter from an undeformed state of the retainer ring. However, it should be appreciated that an appropriate pliers could be used to initially increase the inner diameter of the retainer ring for installation on the tapered section of the pivot bearing for subsequent expansion by the transition section in accordance with the second aspect.

In one embodiment of the second aspect, the outer diameter of the tapered section, either at the first location or somewhere between the first and second locations, is the same as the inner diameter of the retainer ring in an undeformed or static state. Once the retainer ring is initially disposed on the tapered portion of the outer wall of the pivot bearing, the size of the retainer ring is increased by at least about 8% in one embodiment, and by at least about 10% in another embodiment, prior to being disposed within the retainer ring slot. Stated another way, the diameter of the tapered section at the second location is at least about 8% greater in one embodiment, and at least about 10% greater in another embodiment, than the diameter of the tapered section at the first location to provide for the desired expansion of the retainer ring.

In one embodiment of the second aspect, a cylindrical section of the outer wall is disposed between the retainer ring slot and the second location that defines the "large" end of the tapered section. Other configurations may be appropriate for any length of the outer wall that is disposed between the retainer ring slot and the second location that defines the "large" end of the tapered section. The second location defining the "large" end of the tapered section may also be disposed immediately adjacent to the retainer ring slot.

A third aspect of the present invention is directed to a disk drive head stack assembly. This head stack assembly generally includes at least one head/arm assembly that is mounted on a pivot bearing. This pivot bearing includes an inner bearing member and an outer bearing member that are able to rotate relative to each other. An outer wall or surface of at least a portion of the outer bearing member is in the form of a frustum. A first end of the frustum is smaller than a second end of the frustum, and this second end is located somewhere between the first end and a retainer ring slot that is formed on and disposed about at least a portion of an outer wall of the outer bearing member. A retainer ring is disposed in this retainer ring slot to retain each head/arm assembly of the head stack assembly between the retainer ring and a second stop associated with the outer bearing member. The various features discussed above in relation to the second aspect may be utilized by this third aspect, individually or in any combination.

A fourth aspect of the present invention is directed to a disk drive head stack assembly. This head stack assembly generally includes at least one head/arm assembly that is mounted on a pivot bearing. This pivot bearing includes an inner bearing member and an outer bearing member that are able to rotate relative to each other. An outer wall or surface of the outer bearing member includes a retainer ring slot that is disposed about at least a portion of the outer wall. At least a portion of the outer wall is contoured to increase the diameter of a retainer ring that is engaged with the outer wall as the retainer ring is being relatively advanced toward the retainer ring slot. The retainer ring is disposed in this retainer ring slot to retain each head/arm assembly of the head stack assembly between the retainer ring and a second stop associated with the outer bearing member. The various features discussed above in relation to the second aspect may be utilized by this fourth aspect, individually or in any combination.

A fifth aspect associated with the present invention is directed to a disk drive head stack assembly. This head stack assembly generally includes at least one head/arm assembly that is mounted on a pivot bearing. This pivot bearing includes an inner bearing member and an outer bearing member that are able to rotate relative to each other. An outer wall or surface of the outer bearing member includes a retainer ring slot that is disposed about at least a portion of the outer wall. The outer wall has a first effective diameter at a first location and a second effective diameter at a second location that is spaced from the first location in the direction of a retainer ring slot that is formed about at least a portion of the outer wall. The first effective diameter is about equal to the effective diameter of a retainer ring in a neutral state or when no external forces are modifying its shape. Moreover, the second effective diameter is larger than the first effective diameter. The retainer ring is disposed in the retainer ring slot to retain each head/arm assembly of the head stack assembly between the retainer ring and a second stop associated with the outer bearing member. The various features discussed above in relation to the second aspect may be utilized by this fifth aspect, individually or in any combination.

A sixth aspect of the present invention generally relates to an actuator arm assembly for disk drives in which a stack of actuator arm assembly components are compressed together to maintain the same in a certain fixed positional relationship by as few as one spring, such as an annular spring washer(s) (e.g., more than one spring may be utilized). In this regard, the actuator arm assembly includes a pivot which is attachable to an encasement for the disk drive. Two stops of sorts are provided on the pivot (e.g., vertical stops in the case where the pivot is vertically disposed). One or more of the stops could be integrally formed with the pivot or separately attachable to the pivot. Appropriate "stops" would include flanges, retaining/snap rings, or the like.

A stack of actuator arm assembly components is disposed between the two noted stops and interfaces with a pivot shaft of the pivot. The stack includes at least one, and preferably no more than three, individual actuator arms, but could also include voice coil motor componentry or the like (e.g., an arm that carries the coil). Each actuator arm has a flexible load beam attached thereto which extends over a computer-readable storage medium disk (e.g., one for the disk "above" the arm and another for the disk "below" the arm). Information is read from the disk, written to the disk, or both, through a head(s) which is attached on typically that end portion of the load beam which is displaced from the typically rigid actuator arm. The noted stack of actuator arm assembly components is compressed together to register the arms to the intended location at least somewhere between the two noted stops to maintain the same in a fixed positional relationship through only one or more springs.

Various refinements exist of the features noted in relation to the sixth aspect of the present invention. Further features may also be incorporated in the sixth aspect of the present invention as well. These refinements and additional features may exist individually or in any combination. The noted pivot may be defined by a pivot bearing or cartridge bearing assembly which allows the actuator arm(s) to pivot/rotate relative to the encasement for the disk drive. One of the stops may be defined by the structure of this cartridge bearing assembly (e.g., a flange formed on an end portion thereof), while another of the stops may be defined by a retaining ring or the like which is detachably connected to the cartridge bearing assembly. In this case an annular groove, slot or the like may be formed about the pivot shaft for receipt of this retaining ring and against which the noted spring(s) may act to compress the actuator arm assembly stack. This simplifies the assembly procedure of the disk drive, and thereby reduces costs. Particulate amounts within the disk drive should also be reduced in relation to disk drives which use threaded connections to clamp the actuator arm assembly stack together.

Each actuator arm utilized by the sixth aspect may include an aperture through which the noted pivot shaft extends such that each actuator arm encircles the pivot shaft. Each actuator arm preferably includes a substantially planar surface in at least proximity to the pivot shaft to provide a suitable surface with radius of contact over which a frictional interface may be established with adjacent components in the stack through the axially-directed load provided by the noted spring(s). Preferably each actuator arm is of at least substantially uniform thickness. Minimizing the thickness of each actuator arm will also reduce inertial forces, which will in turn further reduces the potential for relative radial movement between components of the actuator arm assembly stack which is being maintained by the compressive forces of the spring(s).

One particularly desirable spring for this application in the case of the sixth aspect is a Belleville spring which is of an annular configuration and which is at least generally frustumly shaped (e.g., truncated cone). Sufficient axial loads may be generated by such a Belleville spring to maintain the components of the actuator arm assembly stack in the desired position during normal disk drive operations, including loads which exceed the inertial forces to which the actuator arm assembly is exposed during rotation of the same, as well as assembly and handling loads. This is believed to particularly be the case when no more than 3 actuator arms are included in the stack. However, preferably the spring is able to maintain the positional relationship between the various components of the stack when exposed to a crash stop impact or when exposed to other non-op shocks (e.g., via a dropping of the disk drive).

DETAILED DESCRIPTION OF THE INVENTION

Figure 1:
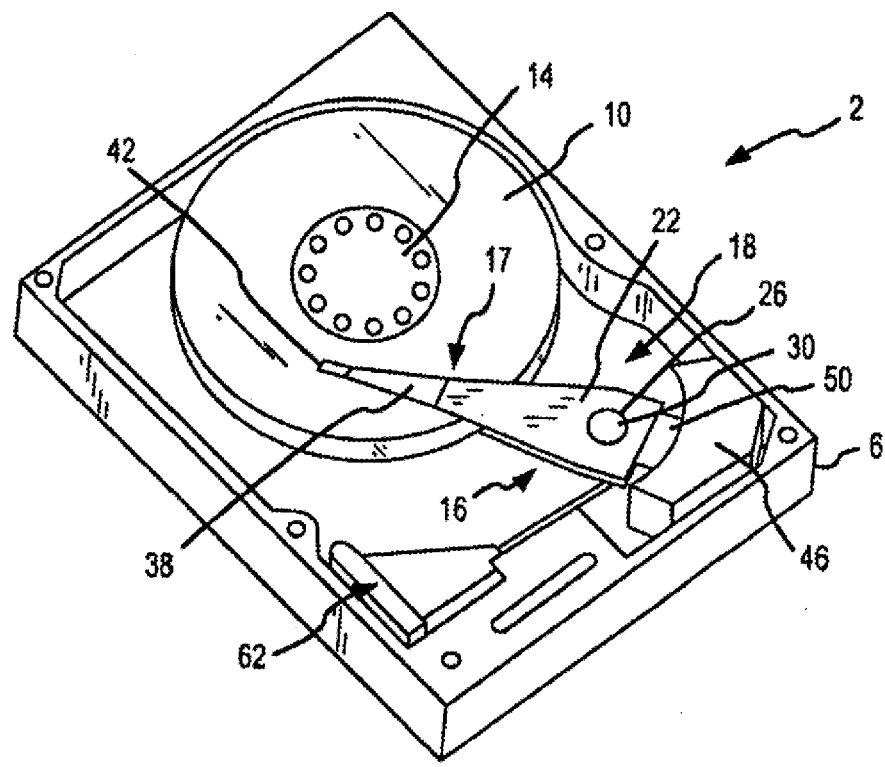
FIG. 1 is a perspective view of one embodiment of a disk drive.

The present invention will now be described in relation to the accompanying drawings which at least assist in illustrating its various pertinent features. FIG. 1 presents a disk drive 2 having a disk drive housing defined by a base plate 6 and a cover that is appropriately attached thereto (not shown). The disk drive 2 generally includes a disk 10 of an appropriate computer-readable storage medium and a head stack assembly 16 for reading information from and writing information to the disk 10. The disk 10 is mounted on a rotatable spindle 14 for rotation by an appropriate motor (not shown) within an at least substantially horizontal reference plane. Typically the disk 10 will include a plurality of tracks which are concentrically disposed about the spindle 14 and which may be used to store information in discrete regions of the disk 10.

The head stack assembly 16 includes a head/arm assembly stack 18. Referring now to FIG. 2–4B as well, the stack 18 includes two individual and discrete actuator arms 22 (e.g., separate structures) which are individually mounted on an actuator arm pivot bearing or cartridge bearing assembly 30. These actuator arms 22 are at least substantially rigid structures (i.e., little or no deflection during normal operations of the disk drive 2) and extend from the cartridge bearing assembly 30 to a location which is "over" opposing surfaces of the disk 10 in cantilevered fashion. Each actuator arm 22 includes a circular mounting aperture 26 through which a hub 34 of the cartridge bearing assembly 30 extends. At least those surfaces of the actuator arms 22 which are disposed about the mounting aperture 26 are of a substantially planar nature for enhancing the frictional interface between the various components of the stack 18. However, in one embodiment the entirety of each actuator arm 22 is of substantially uniform thickness throughout its entire length.

Disposed on an end portion of each of the actuator arms 22 is a flexible load beam or suspension 38. There is a head 42 (e.g., one or more transducers formed on/in a slider or slider body) mounted on typically an end portion of each of the load beams 38. Each actuator arm 22 and its corresponding load beam 38 and head 42 may be characterized as a head/arm assembly 17. In any case, preferably the heads 42 are capable of both reading information from and writing information to the corresponding surface of the disk 10. However, both of these functions are not required for purposes of the present invention. The heads 42 may be disposed on the corresponding surface of the disk 10 prior to powering the disk drive 2 (e.g., of a contact start/type drive). Various lift mechanisms may be employed to displace the heads 42 from the disk 10 during the initial powering up stage of the disk drive 2, although such is also not required for purposes of the present invention. The drive 2 may also be in the form of a dynamic load/unload configuration. In any case, during normal operations of the disk drive 2 each head 42 may be disposed at a certain fly height above the corresponding surface of the disk 10 which is determined by the rotational speed of the disk 10 (which generates an air cushion which biases the heads 42 away from the disk 10) and the flexure of the load beams 38 (which typically biases the heads 42 toward the corresponding disk 10). Contact or near contact recording technologies could also be utilized.

Rotation of the disk 10 may be used to vary the relative positioning between the disk 10 and the heads 42 at a particular data storage region of the disk 10. Other data storage regions of the disk 10 are accessed by a pivoting of the head stack assembly 16 about the cartridge bearing assembly 30. One appropriate rotational drive assembly of sorts is a voice coil motor 46 which is controlled by control electronics 62. Part of the voice coil motor 46 is in the form of one or more stationary magnets (not shown). Another part of the voice coil motor 46 is the form of a coil which is incorporated in a coil/overmold assembly 50. This coil/overmold assembly 50 is included in the head/arm assembly stack 18. In this regard, the coil/overmold assembly 50 includes a mounting aperture 52 through which the hub 34 of the cartridge bearing assembly 30 extends. One of the actuator arms 22 is disposed above the coil/overmold assembly 50, while the other of the actuator arms 22 is disposed below the coil/overmold assembly 50. A central disposition of the coil/overmold assembly 50 (along/relative to the hub 34 of the cartridge bearing assembly 30) within the stack 18 is desired since the operative interface of sorts between the coil/overmold assembly 50 and the magnet of the voice coil motor 46 is what rotationally drives the head/arm assembly stack 18. That is, preferably ½ of the stack 18 is on each side of the coil/overmold assembly 50 (e.g. above and below the coil/overmold assembly 50).

Pivotal motion of the head stack assembly stack 16 via the voice coil motor 46 moves the heads 42 to a different radial position on their corresponding disk 10 (e.g., to a different one of the concentrically disposed tracks formed on such disk 10). Simultaneous radial movement of all components of the head stack assembly 16 is preferred, as is the maintenance of the same relative radial positioning between each of the components of the stack 18 at all times and including during movement thereof. Any significant relative radial movement between any of the actuator arms 22, or the coil/overmold assembly 50 for that matter, relative to the remainder of the head/arm assembly stack 18 may and likely will adversely affect the storage and/or retrieval of information to/from the disk 10. "Slippage" between the components of the stack 18 could result in one of the actuator arms 22 moving say 5°, with the other of the actuator arms 22 moving say only 4°. This may be sufficient to dispose one of the heads 42 on the "wrong" track on the disk 10 or more generally at the "wrong" data storage address on the disk 10. "Small" amounts of relative radial movement between the components of the head/arm assembly stack 18 should produce no degradation in performance of the disk drive 2. An "intermediate" amount of relative radial movement between the components of the head/arm assembly stack 18 may produce some degradation in performance of the disk drive 2. "Large" amounts of relative radial movement between the components of the head/arm assembly stack 18, however, will likely result in the loss of data. The forces applied to the head/arm assembly stack 18 by one or more appropriate biasing members.(e.g., a Belleville spring 54) at least should alleviate those "large" amounts of relative radial movement which result in the subsequent loss of data.

Figure 5:
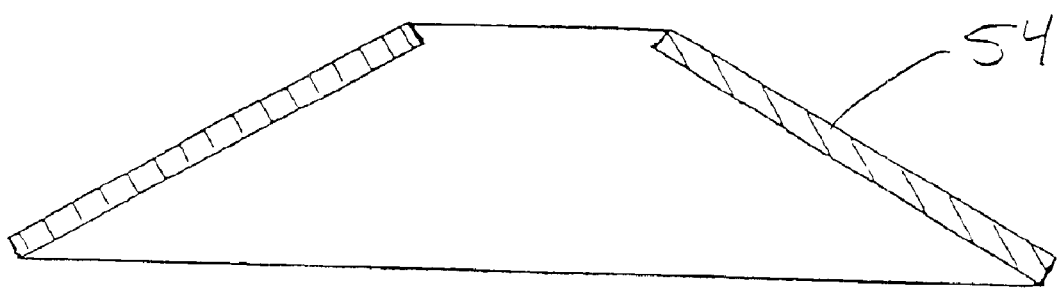
FIG. 5 is one embodiment of a Belleville spring which may be used in the head/arm assembly stack from the disk drive of FIG. 1.
Figure 2:
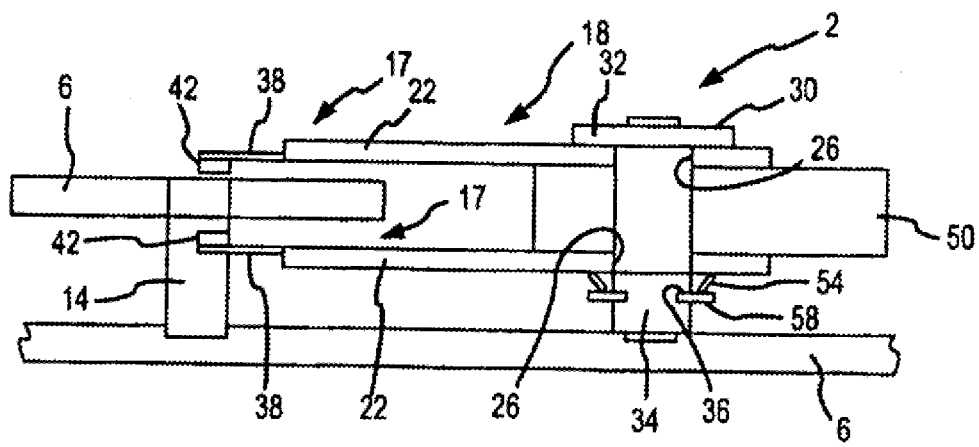
FIG. 2 is a cutaway side view of the head/arm assembly stack and computer-readable storage medium disk from the disk drive of FIG. 1.
Figure 3:
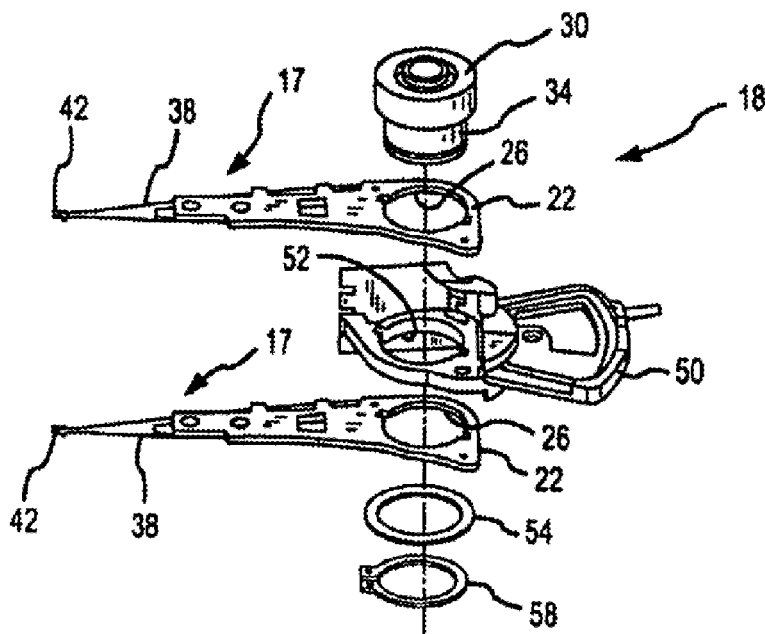
FIG. 3 is an exploded, perspective view of the head/arm assembly stack from the disk drive of FIG. 1.
Figure 4A:
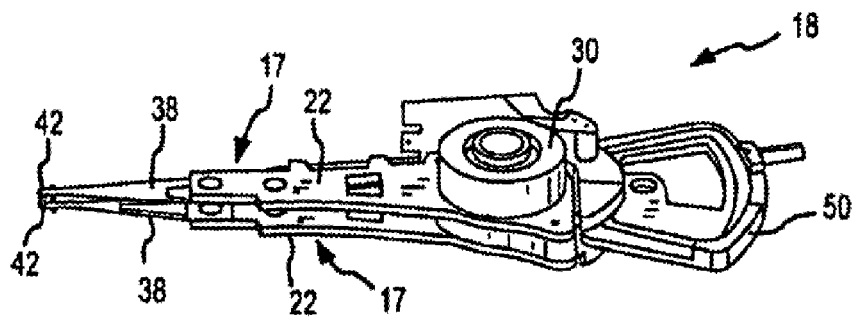
FIGS. 4A–B are perspective views of the head/arm assembly stack from the disk drive of FIG. 1 in the assembled condition.
Figure 4B:
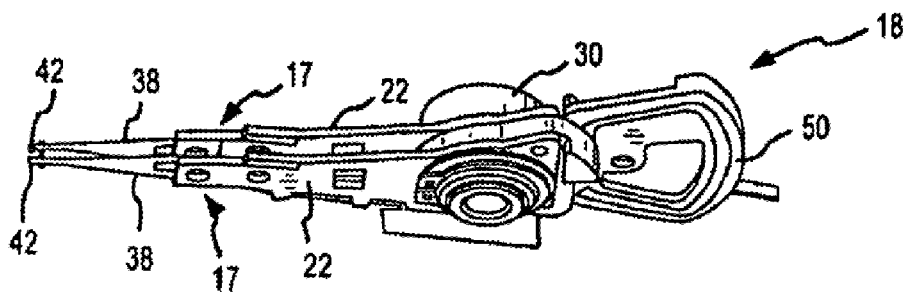
Figure 5:
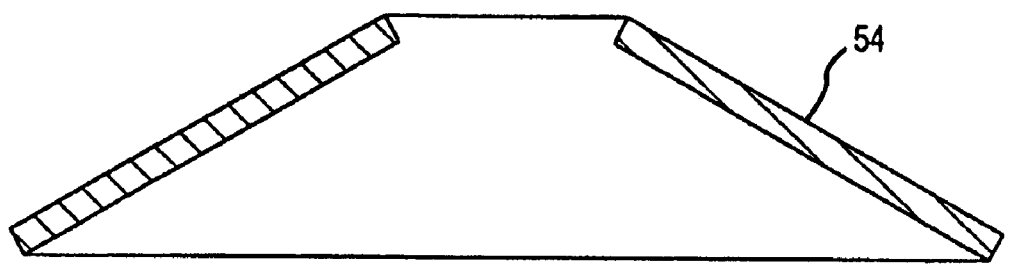
Figure 6A:
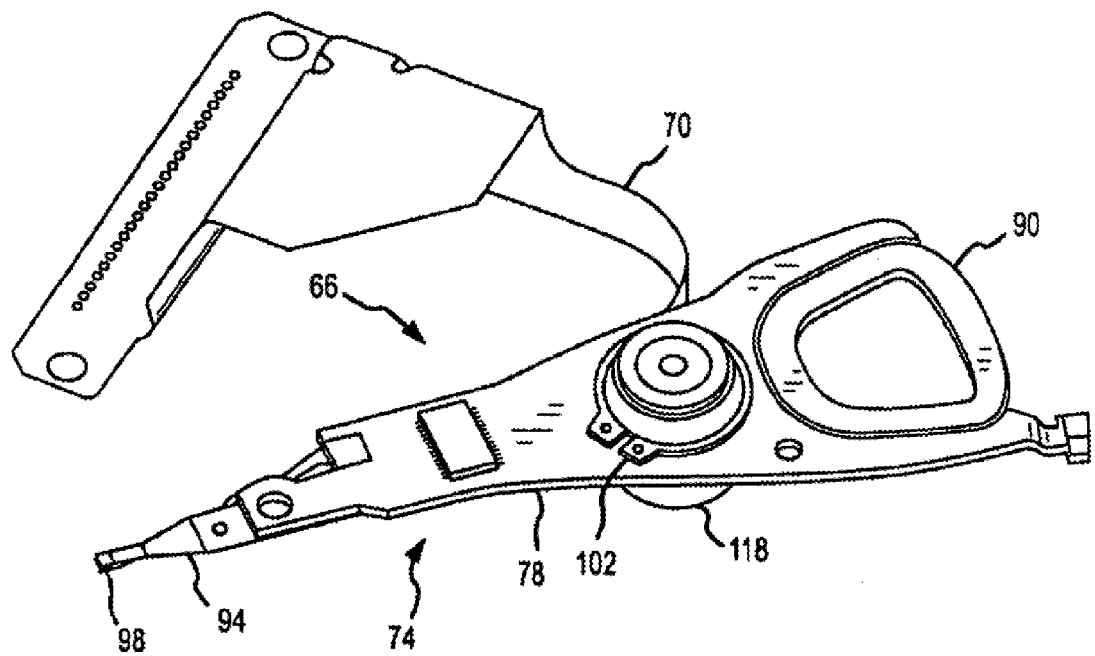
Figure 6B:
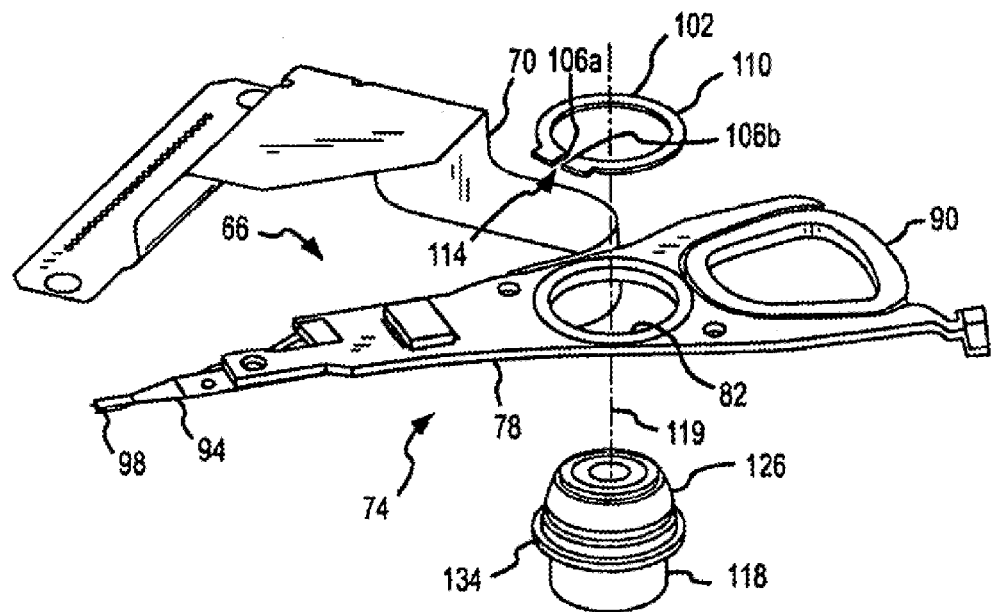
Figure 7B:
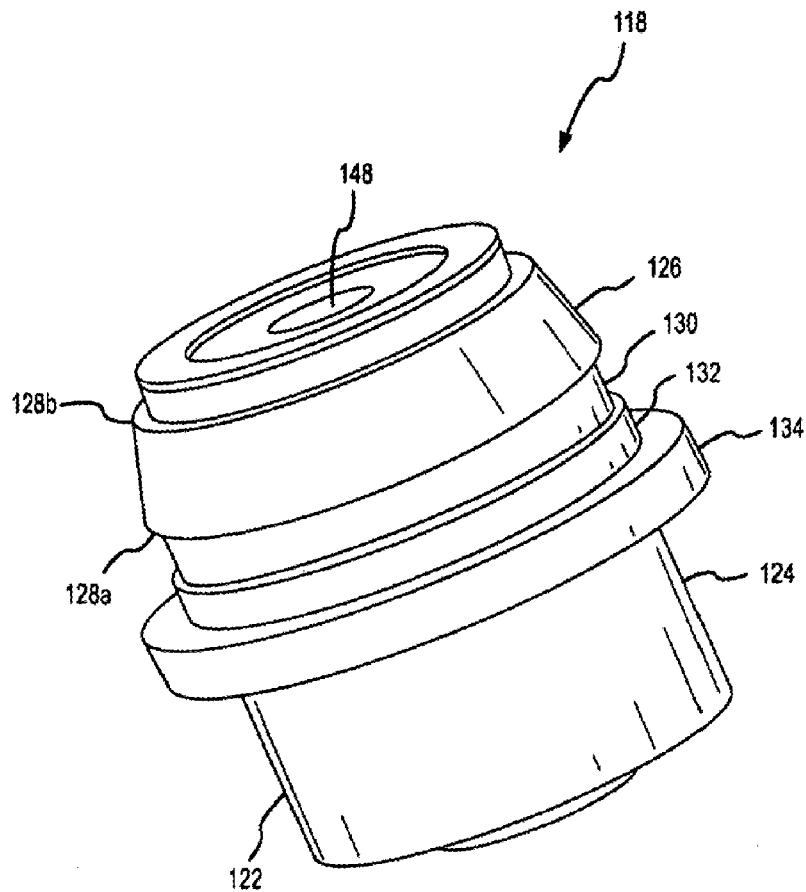
Figure 7A:
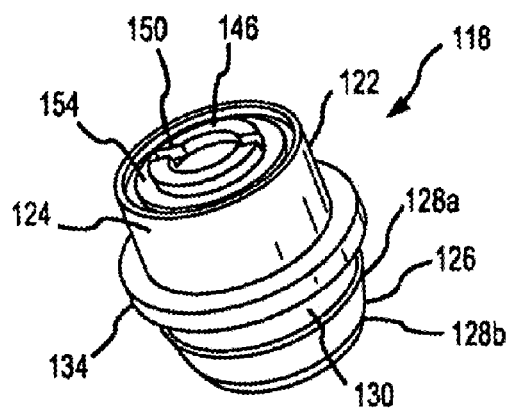
Figure 7C:
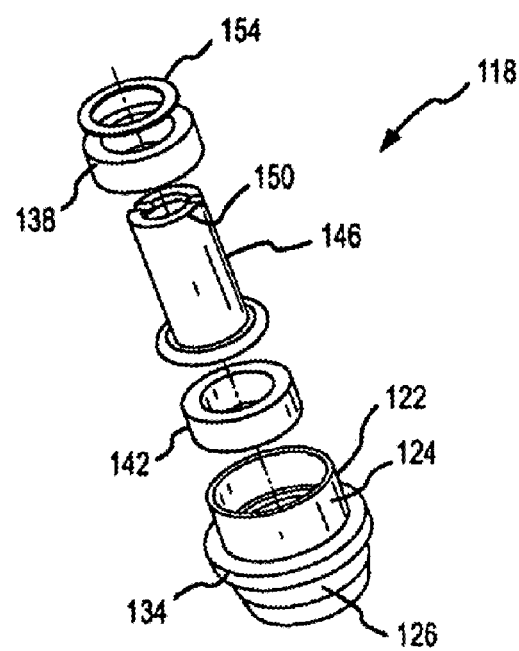
Figure 7D:
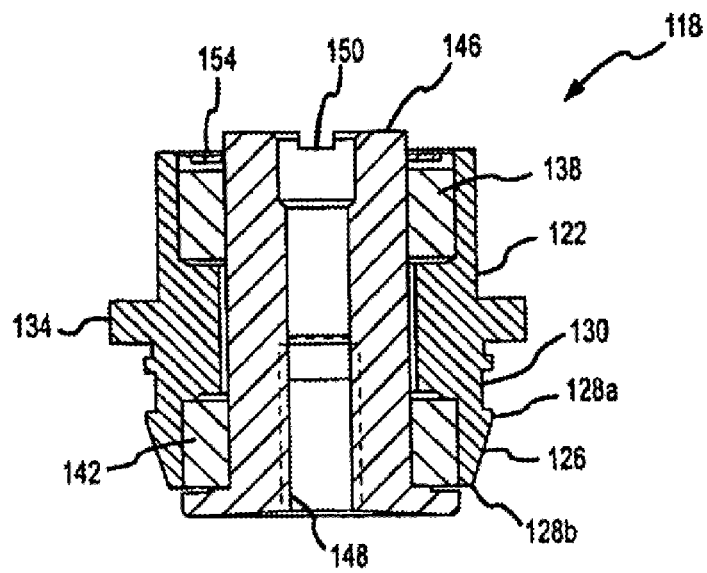
Figure 7E:
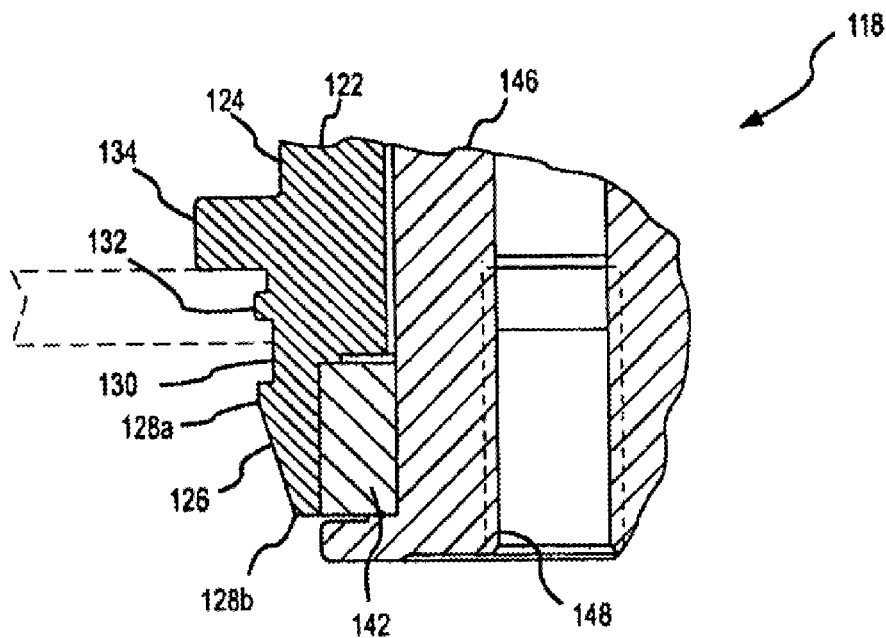
Figure 1:
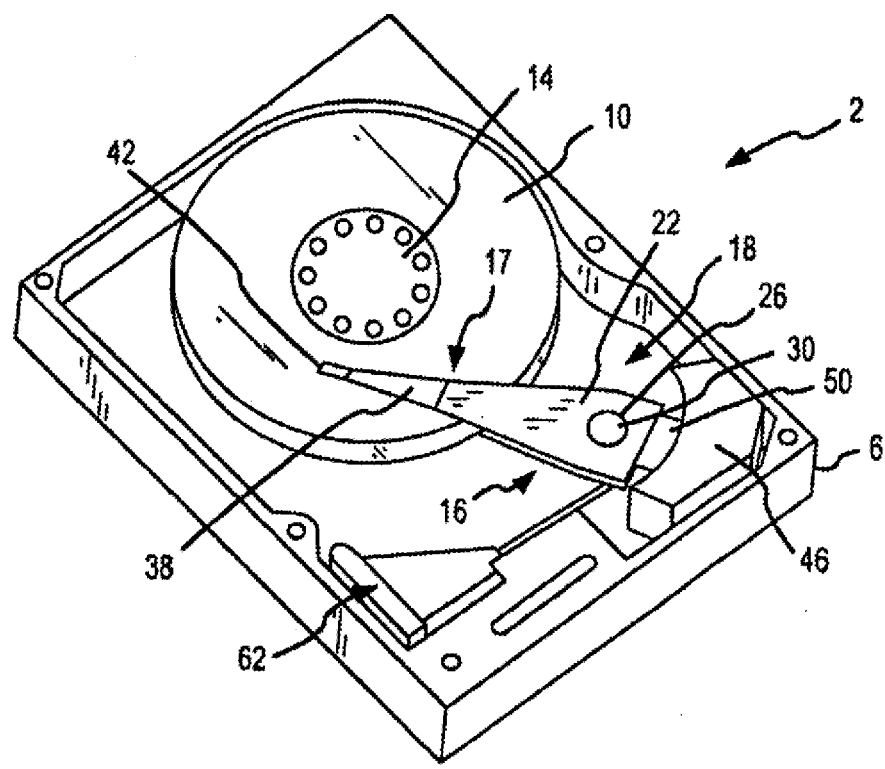
Figure 2:
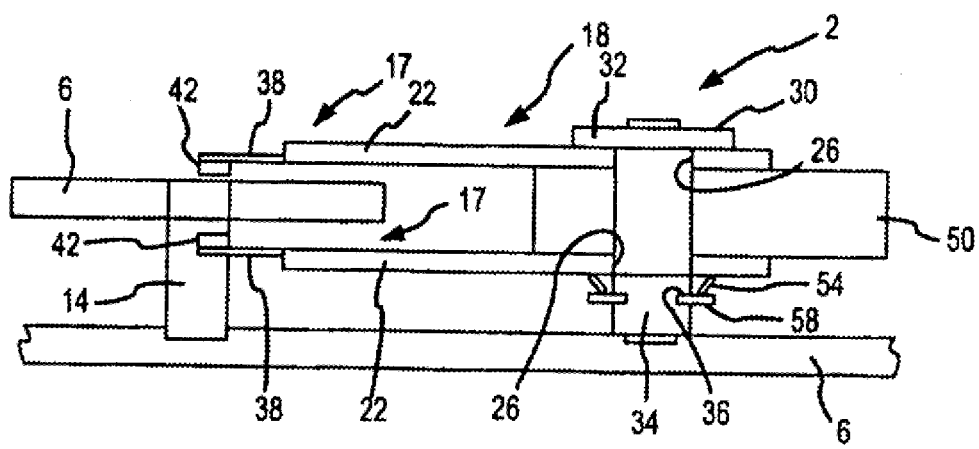
Figure 3:
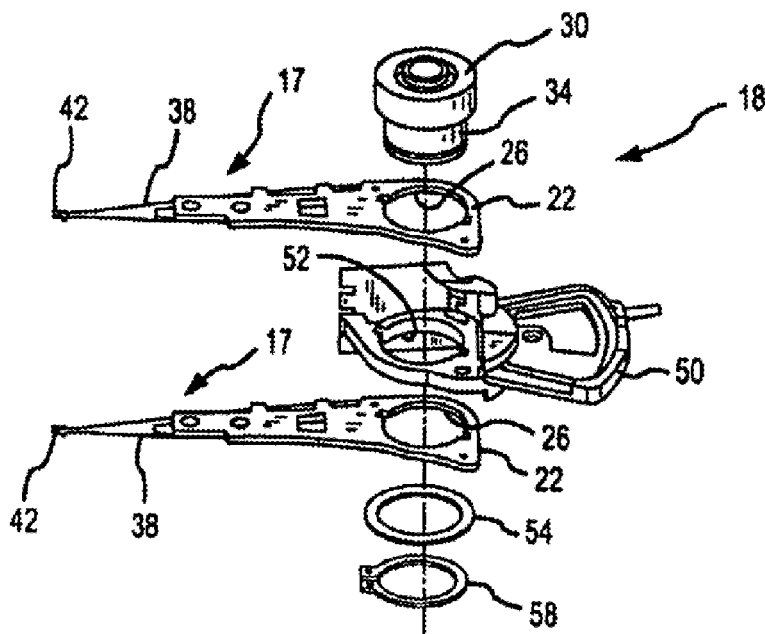
Figure 4A:
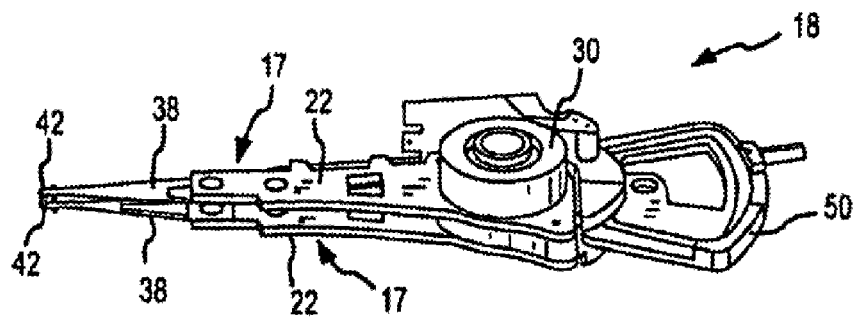
Figure 4B:
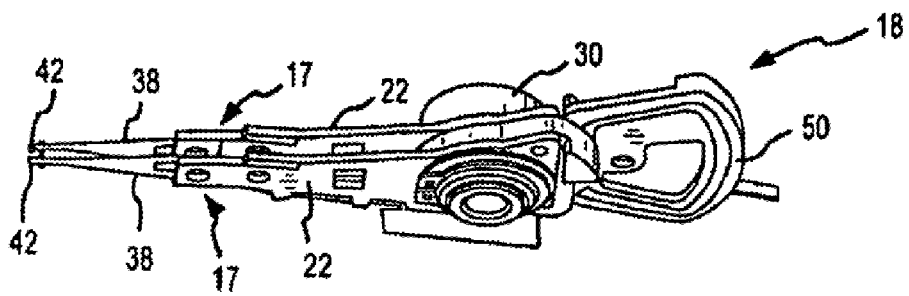
Figure 5:
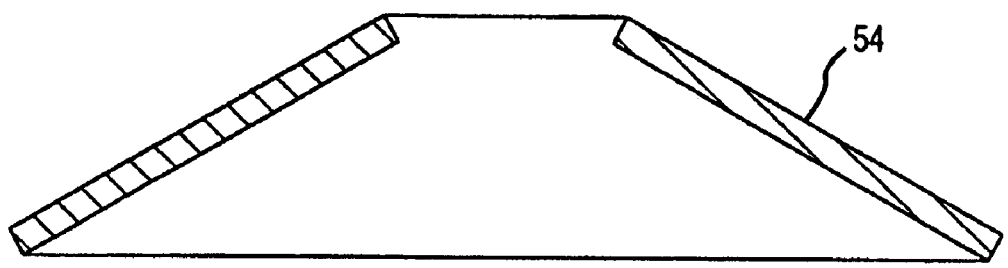
Figure 6A:
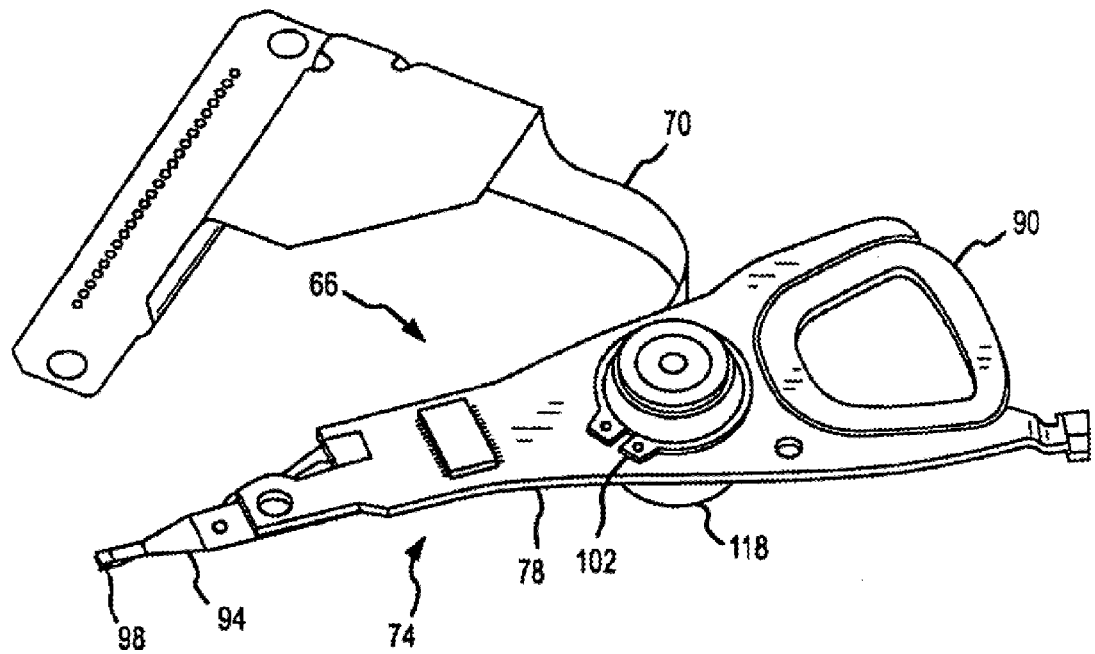
Figure 6B:
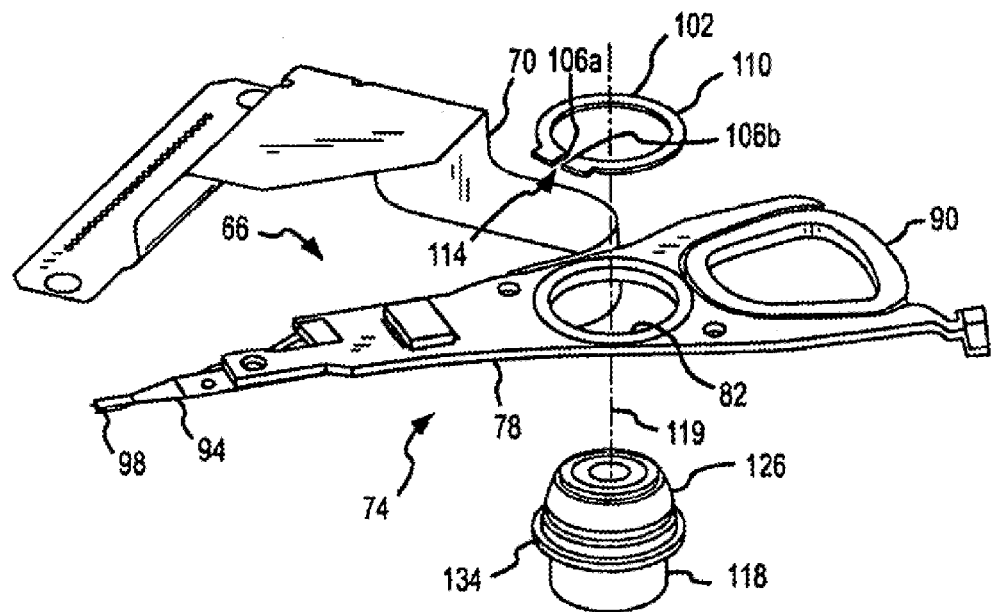
Figure 7B:
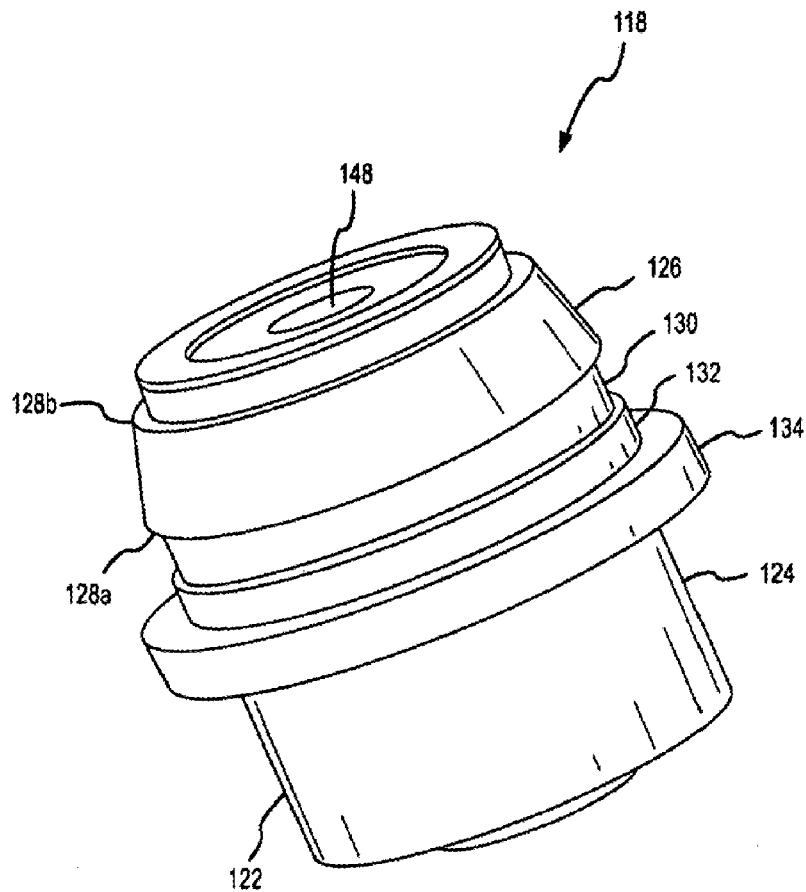
Figure 7A:
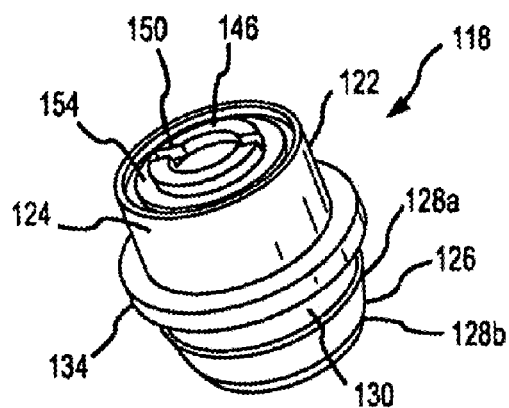
Figure 7C:
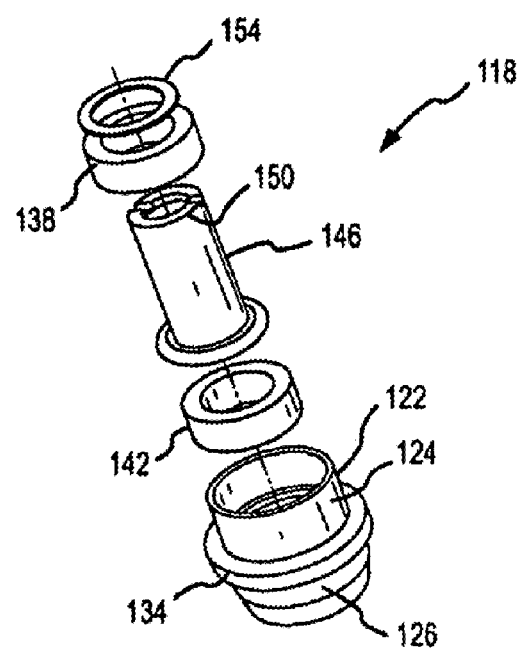
Figure 7D:
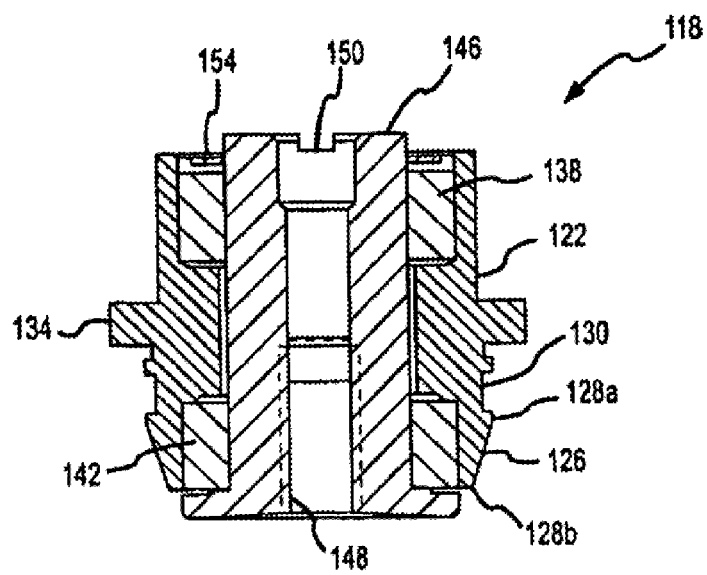
Figure 7E:
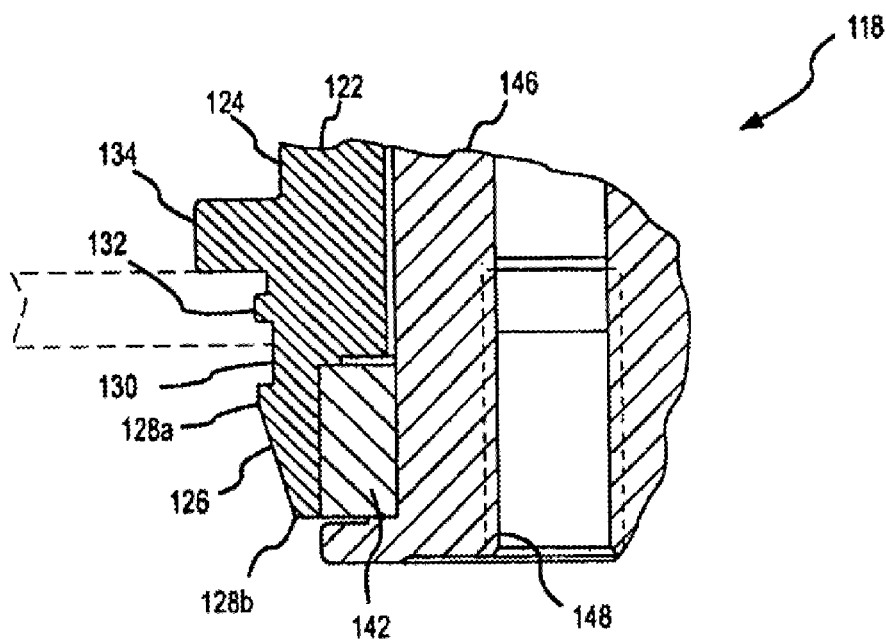

Components of the head/arm assembly stack 18 are maintained in a fixed positional relationship relative to each other for simultaneous radial movement in the illustrated embodiment by an annular Belleville spring 54 which compresses the stack 18 together. As can be seen in FIGS. 2 and 5, the spring 54 has an at least generally frustumly-shaped profile. The Belleville spring 54 is mounted on the hub 34 of the cartridge bearing assembly 30 and exerts an at least generally axially-directed load on the head/arm assembly stack 18 to compress the same together and maintain its components in the desired fixed positional relationship. In this regard, the hub 34 of the cartridge bearing assembly 30 includes an annular, square/rectangularly-shaped slot 36 in which a retaining ring 58 or the like is disposed by "snapping" the same into position. Part of the Belleville spring 54 butts up against this retaining ring 58. Another part of the Belleville spring 54 butts up against one of the actuator arms 22. The other of the actuator arms 22 butts up against a flange 32 of the cartridge bearing assembly 30. As such, the head/arm assembly stack 18 is compressed between the flange 32 and the retaining ring 58, or more particularly the Belleville spring 54.

Sufficient axial loads are generated by the Belleville spring 54 so as to establish a frictional interface between adjacent components of the stack 18 which is greater than the inertial forces to which the head/arm assembly stack 18 is exposed during normal disk drive operations, as well as those which may be encountered during assembly and handling. That is, the normal forces exerted on the components of the head/arm assembly stack 18 by the Belleville spring 54 generate frictional forces between interfacing components of the stack 18 which exceeds the inertial forces exerted on the stack 18 during normal operations of the disk drive 2, as well as during assembly and handling, and preferably even when the head/arm assembly stack 18 engages a crash stop (not shown) or when the disk drive 2 is exposed to other reasonable non-op shocks (e.g., due to a dropping of the disk drive 2). Frictional forces between adjacent components of the stack 18 (e.g., those forces which are required to initiate relative radial movement) which are in excess of the inertial forces to which the disk drive 2 is normally exposed means that there should be no relative movement between components of the stack 18. Although other spring washers may be appropriate, use of the Belleville spring 54 is preferred due to its ability to generate rather significant axial loads within relatively small spaces, as well and the uniformity of the axial load provided by the Belleville spring 54 (e.g., about its circumference).

A number of factors contribute to the ability of the disk drive 2 to use the Belleville spring 54 to compress the head/arm assembly stack 18 together in a manner so as to allow no relative radial movement between individual components thereof. Initially is the amount of axial load applied by the Belleville spring 54. In the case where two actuator arms 22 are included in the stack 18, an axially load of about 50 pounds is preferred. Moreover and as noted, interfacing components of the stack 18 preferably mate along at least substantially planar surfaces. Minimizing the diameter of the hub 34 of the cartridge bearing assembly 30 and maximizing the width of the annular extent of the components of the stack 18 about the hub 34 may be implemented to allow for use of a Belleville spring 54 with a smaller inner diameter and a larger outer diameter for generating increased axial forces which would then require a larger force to induce relative radial movement between components of the stack 18.

Figure 6A:
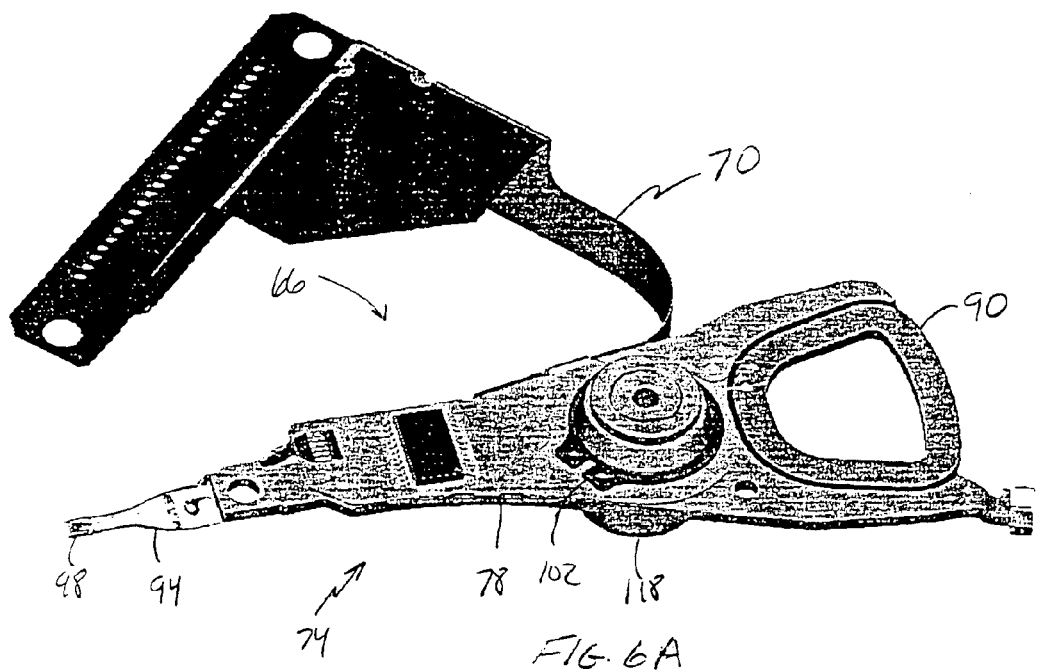
FIG. 6A is a perspective view of another embodiment of a head/arm assembly that is mounted on another embodiment of a pivot bearing and that may be used in the disk drive of FIG. 1.
Figure 6B:
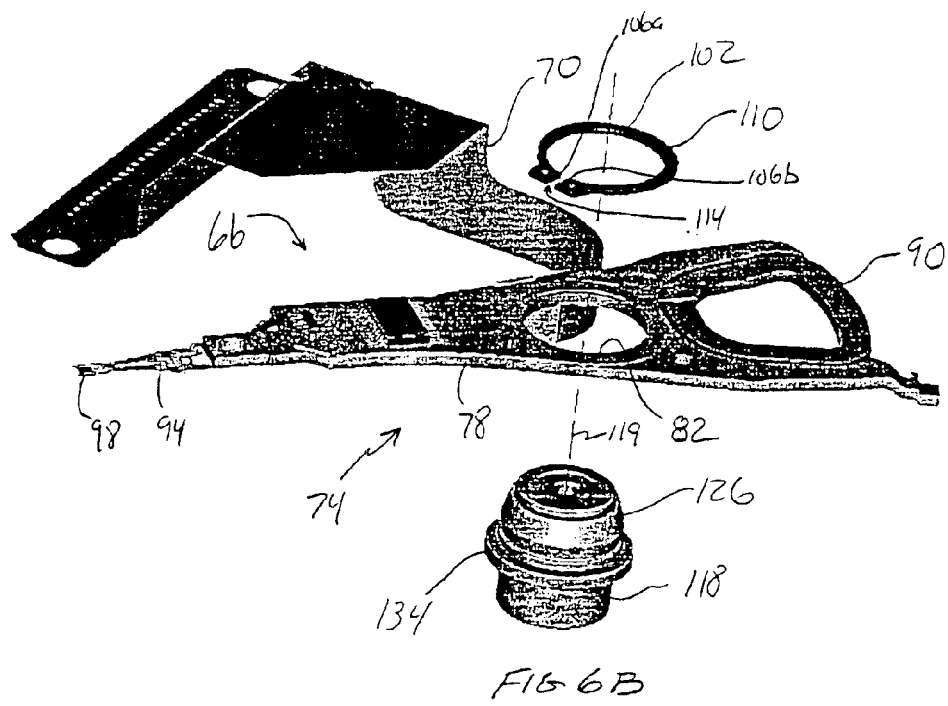
FIG. 6B is an exploded, perspective view of the head/arm assembly and pivot bearing of FIG. 6A.
Figure 7A:
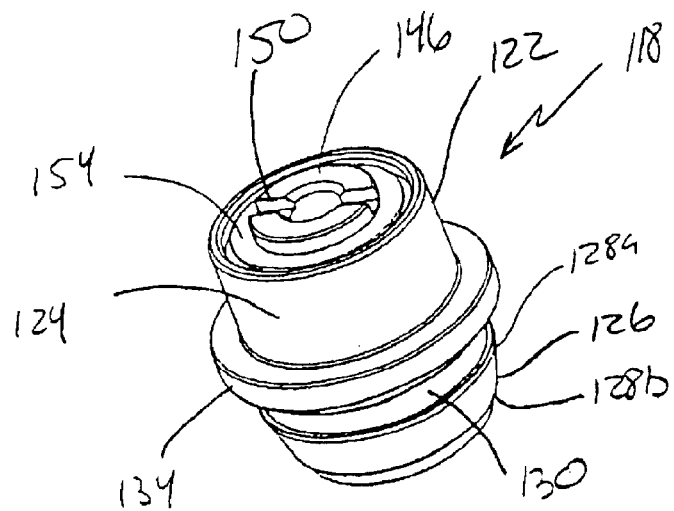
FIG. 7A is a one perspective view of the pivot bearing used by the head/arm assembly of FIG. 6A.
Figure 7C:
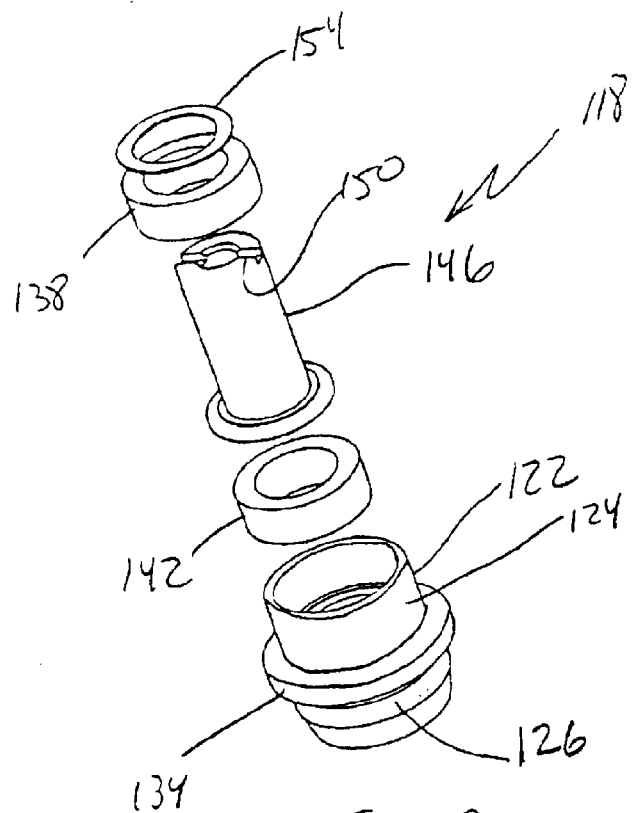
FIG. 7C is an exploded, perspective view of the pivot bearing used by the head/arm assembly of FIG. 6A.
Figure 7B:
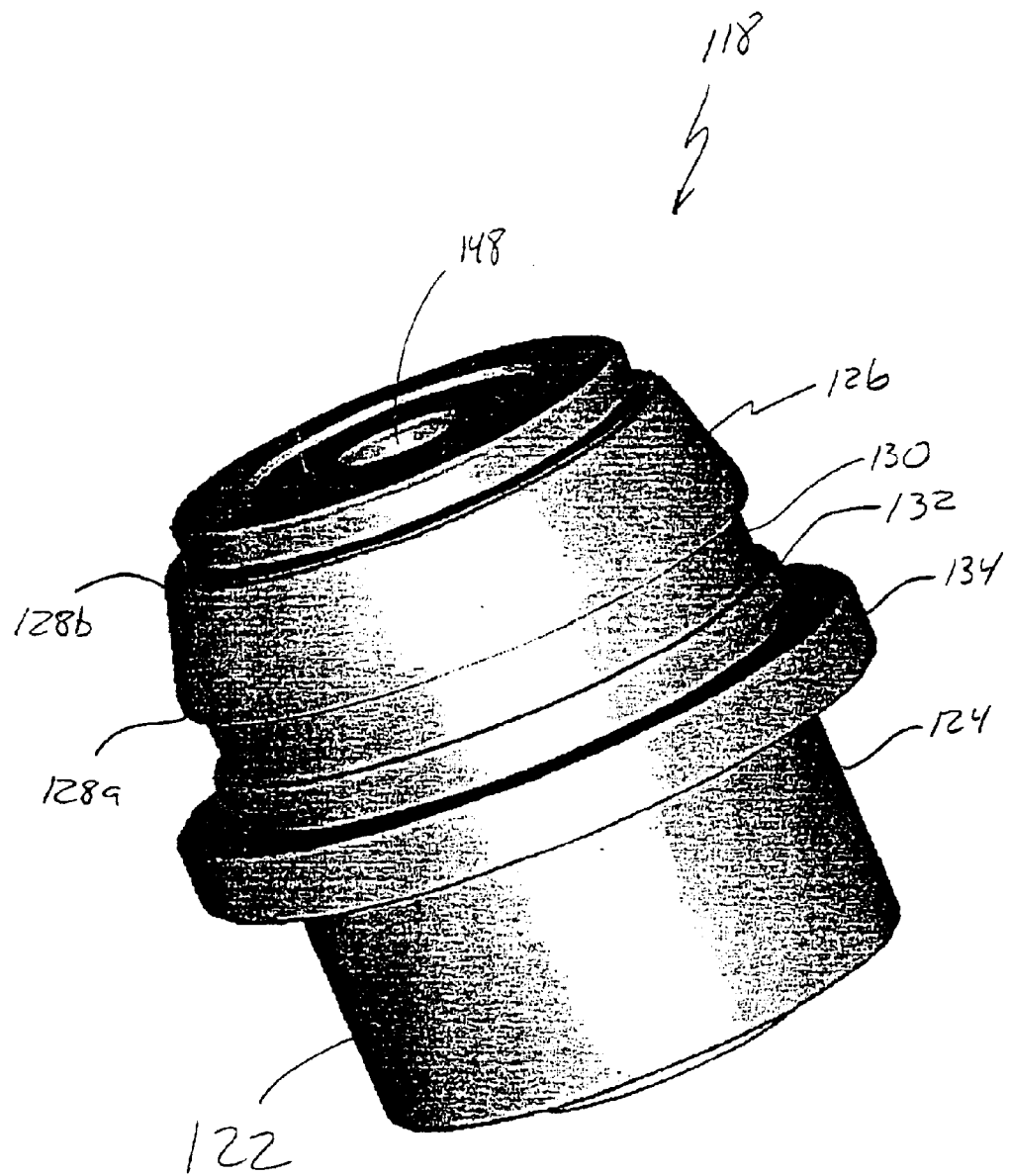
FIG. 7B is a another perspective view of the pivot bearing used by the head/arm assembly of FIG. 6A.
Figure 7D:
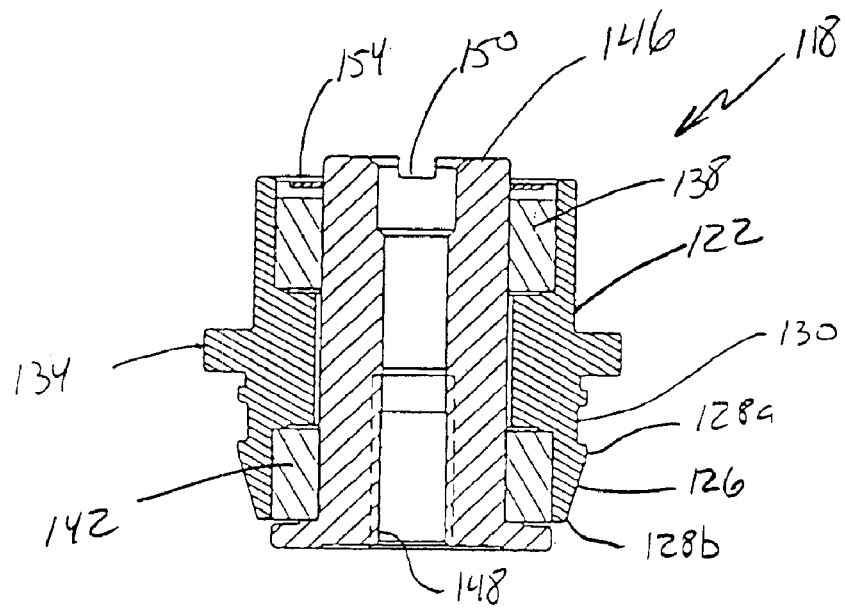
FIG. 7D is a cross-sectional view of the pivot bearing used by the head/arm assembly of FIG. 6A.
Figure 7E:
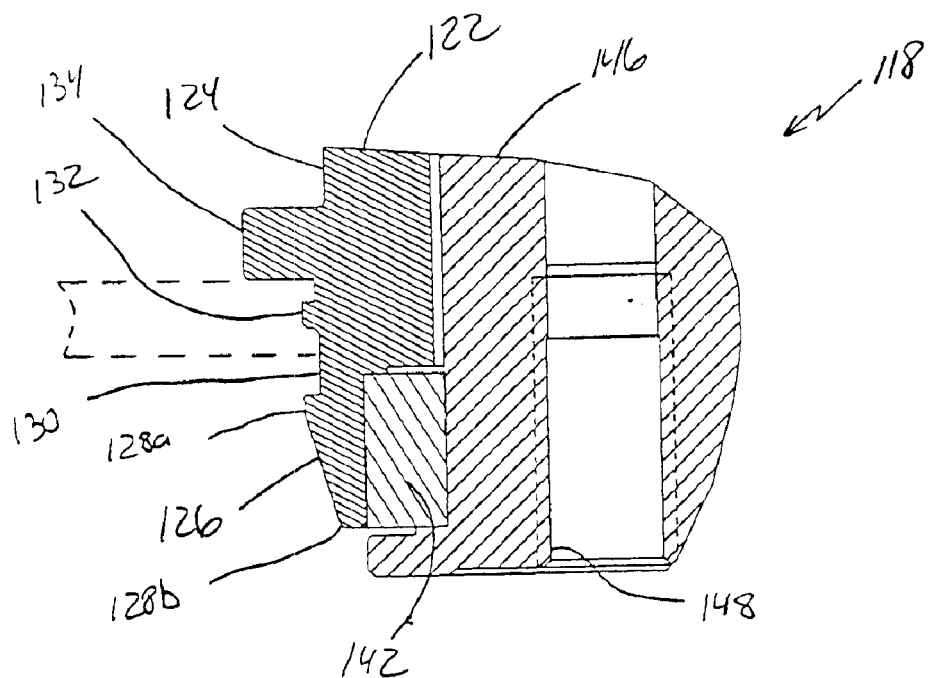
FIG. 7E is an enlarged view of a portion of the pivot bearing of FIG. 7D.

Another embodiment of a head stack assembly that may be utilized by the disk drive 2 of FIG. 1 is illustrated in FIGS. 6A–B and is identified by reference numeral 66. This head stack assembly 66 includes a single head/arm assembly 74. Multiple head/arm assemblies 74 could be utilized by the head stack assembly 66 as well (not shown). The head/arm assembly 74 includes a rigid actuator arm 78. A mounting aperture 82 extends through the entire thickness of the actuator arm 78 to allow the same to be mounted on a pivot bearing or cartridge bearing assembly 118 using a retainer ring or clip 102. The actuator arm 78 is able to pivot or rotate relative to the disk drive housing, and more specifically relative to its corresponding disk, via the pivot bearing 118. The actuator arm 78 is also appropriately configured for receiving a coil 90 used by the drive's voice coil motor. The coil 90 thereby also moves relative to the disk drive housing via the pivot bearing 118, simultaneously along with the actuator arm 78.

The head/arm assembly 74 further includes a typically flexible load beam or suspension 94 that is appropriately mounted on the actuator arm 78 (e.g., staked). A head 98 is mounted on the suspension 94 and includes a slider/slider body and one or more appropriate transducers (e.g., to read and/or write information to/from the corresponding data storage disk). Signals to/from the head 98 are provided by a flex cable 70 having a plurality of traces formed thereon (not shown).

Further details regarding the pivot bearing 118 are illustrated in FIGS. 7A–E in addition to FIGS. 6A–B noted above. The pivot bearing 118 generally includes a shaft or inner bearing member 146 and a sleeve or outer bearing member 122 that may rotate relative to each other by an upper bearing 138 and a lower bearing 142 that are disposed therebetween. The upper bearing 138 and lower bearing 142 may be of any appropriate type/configuration. A threaded bore 148 is included on the shaft 146 at one end thereof. This threaded bore 148 receives a threaded stud that extends up from the base plate of the disk drive housing. The opposite end of the shaft 146 includes a slot 150 than may be used to mount the shaft 146 on this threaded stud by rotating the shaft 146 relative to the base plate, to in turn thread the shaft 146 onto this stud. A hubcap 154 is press fit onto the end of the shaft 146 having the slot 150.

The sleeve 122 is configured to facilitate the mounting of the head/arm assembly 74 on the pivot bearing 118. In this regard, an outer wall or surface 124 of the sleeve 122 includes what may be characterized as a tapered section 126. One end 128b of this tapered section 126 has a smaller effective diameter than an opposite end 128a of this same tapered section 126. In one embodiment, the tapered section 126 is frustumly-shaped or contoured in the form of a truncated cone. Stated another way, the tapered section 126 has a constant slope progressing from the end 128b to the end 128a. Preferably the magnitude of this slope is at least about 0.1 in one embodiment, is at least about 0.2 in another embodiment, and is at least about 0.3 in yet another embodiment. The rate at which the retainer ring 102 is expanded by engagement with and movement relative to the pivot bearing 118 may be dictated by physical space limitations (e.g., the distance that the retainer ring 102 may advance along the rotational axis 119 to be expanded may be limited by space restrictions). Generally, a more gradual expansion of the retainer ring 102 is preferred.

Another related characterization of the tapered section 126 is in terms of the above-noted expansion ratio. The "expansion ratio" in relation to the pivot bearing 118 is a ratio of the amount that the retainer ring 102 expands by moving along the tapered section 126 (e.g., "expansion" being in a direction that is perpendicular to the rotational axis 119 of the pivot bearing 118), to the distance that the retainer ring 102 has advanced along the tapered section 126 in a direction that is perpendicular to the direction of the expansion (e.g., in a direction that is parallel with the rotational axis 119 of the pivot bearing 118). The expansion ratio of the tapered section 126 is at least about 0.2 in one embodiment, is at least about 0.4 in another embodiment, and is at least about 0.6 in yet another embodiment (e.g., twice the slope of the transition section 126). Other configurations of the outer wall 124 may be appropriate for expanding the retainer ring 102 as it is advanced relative to the pivot bearing 118 for disposition within the retainer ring slot 130. For instance, the tapered section 126 could have at least somewhat of an arcuate shape/profile progressing between its ends 128a, 128b (not shown).

The end 128a of the tapered section 124 will typically be disposed at least generally adjacent to a retainer ring slot 130 formed on the outer wall 124 of the sleeve 122 . A portion of the outer wall 124 may be parallel with the pivot axis of the pivot bearing 118 between the end 128a and the retainer ring slot 130 (e.g., a cylindrical section). The end 128a could also be disposed immediately adjacent to the retainer ring slot 130. The outer diameter of the retainer ring slot 130 is less than the outer diameter of the end 128a of the tapered section 126 in the illustrated embodiment. The retainer ring 102 is advanced along the tapered section 126, which increases its effective diameter, so as to be able to be disposed in this retainer ring slot 130. This retains the head/arm assembly 74 between the clip 102 and a flange 134 that is spaced from the retainer ring slot 130 and that is part of the sleeve 122. An actuator arm protrusion 132 may be included on the sleeve 122 as well for interfacing with the actuator arm 78 (e.g., to locate the same relative to the pivot bearing 118).

It should be appreciated that the sleeve 122 of the pivot bearing 118 could be configured to accommodate multiple actuator arms 78 between the retainer ring 102 and the flange 134. One or more biasing members (e.g., a Belleville spring 54) also could be utilized to maintain the actuator arm(s) 78 in compression between the retainer ring 102 and the flange 134. For instance, a Belleville spring 54 could be disposed with its smaller diameter end disposed against the flange 134 and its larger diameter end engaged with an actuator arm 78, a Belleville spring 54 could be disposed with its smaller diameter end disposed against the retainer ring 102 with its larger diameter end engaged with an actuator arm 78, or both. This would then function to apply a compressive force to all head/arm assemblies 74 that are disposed or located between the retainer ring 102 and the flange 134. All head/arm assemblies 74 could be biased toward the flange 134 or toward the retainer ring 102. Another option would be to bias at least one head/arm assembly 74 away from the flange 134 and to bias at least one head/arm assembly away from the retainer ring 102 (e.g., in the case where a Belleville spring 54 is disposed between the flange 134 and a stack of head/arm assemblies 74, and where another Belleville spring 54 is disposed between the retainer ring 102 and the stack of head/arm assemblies 74).

The configuration of the pivot bearing 118 significantly enhances the manner in which one or more head/arm assemblies numeral 74 may be mounted on the pivot bearing 118. Consider the case where the head stack assembly includes a single head/arm assembly 74 as shown in FIGS. 6–B. The head/arm assembly 74 would be disposed on the pivot bearing 118 so that it engaged or butted up against the flange 134 (e.g., the pivot bearing 118 extends through the mounting aperture 82 that extends through the actuator arm 78 of the head/arm assembly 74). The retainer ring 102 would then be disposed adjacent to the end 128b of the tapered section 126 of the sleeve 122. The effective inner diameter of the retainer ring 102 is preferably at least generally the same as or possibly slightly larger than the effective outer diameter of the end 128b. Preferably little to no expansion of the retainer ring 102 is required to initially position the same on the tapered section 126 at the end 128b.

The ends 106a, 106b of the retainer ring 102 would be separated by an open space 114 of a first magnitude when the retainer ring 102 is disposed on the tapered section 126 proximate to the end 128b. An arcuate section 110 of the retainer ring 102 is located between these ends 106a, 106b. The retainer ring 102 may then be advanced along the tapered section 126. There are multiple characterizations of this motion. One is that the retainer ring 102 is moved axially relative to the pivot bearing 118. Another characterization is that the retainer ring 102 is moved at least generally parallel with a rotational axis 119 of the pivot bearing 118 (FIG. 6B). Yet another characterization is that the retainer ring 102 is moved concentrically relative to the pivot bearing 118. Relative movement of the noted type is all that is required between the retainer ring 102 and the pivot bearing 118.

The above-noted relative movement between the retainer ring 102 and the pivot bearing 118 to advance the retainer ring 102 along the tapered section 126, while in continued engagement therewith, increases the effective diameter of the retainer ring 102 or expands the size of the retainer ring 102. Another way to characterize the response of the retainer ring 102 is that the magnitude of the open space 114 between its ends 106a, 106b increases during this movement of the retainer ring 102 relative to the sleeve 122 and that is in the direction of the retainer ring slot 130.

The retainer ring 102 will be at its maximum diameter when it is disposed at the end 128b of the tapered section 126. The retainer ring 102 has a certain amount of resilience or elasticity. Further movement of the retainer ring 102 toward the flange 134 will cause the retainer ring 102 to "snap" into the retainer ring slot 130. The spring properties or elasticity of the retainer ring 102 causes this movement and also forcibly retains the same within the retainer ring slot 130. That is, preferably the retainer ring 102 exerts an active, inwardly directed force on the sleeve 102. Disposing the retainer ring 102 within the retainer ring slot 130 further fixes the position of the actuator arm 78 relative to the sleeve 122 of the pivot bearing 118. That is, there should be little to no relative rotational movement between the actuator arm 78 and the sleeve 122 of the pivot bearing 118 during normal disk drive operations.

Summarizing the foregoing, the retainer ring 102 may be initially mounted on the tapered section 126 of the pivot bearing 118 without having to substantially increase the size thereof. In one embodiment, the size of the retainer ring 102 need not be increased at all to initially dispose the retainer ring 102 on the tapered section 126 of the outer wall 124 of the pivot bearing 118 and so as to be in interfacing relation therewith (e.g., the inner diameter of the retainer ring 102 in an undeformed state is at least as great as an outer diameter of a portion of the tapered section 126). No separate tooling is required to initially position the retainer ring 102 on the tapered section 126 of the outer wall 124 of the pivot bearing 118 in the preferred case. Stated another way, the retainer ring 102 may be manipulated solely by hand to initially dispose the retainer ring 102 on the tapered section 126 outer wall 124 of the pivot bearing 118. In one embodiment, the outer diameter of the tapered section 126, either at the end 128b or somewhere between the ends 128b, 128a, is less than the inner diameter of the retainer ring 102 in an undeformed or static state. Preferably this is the maximum diameter encountered by the retainer ring 102 when initially disposing the same on the outer wall 124 of the pivot bearing 118. Once the retainer ring 102 is initially disposed on the outer wall 124 of the pivot bearing 118, the size of the retainer ring 102 is increased by at least about 8% prior to being disposed within the retainer ring slot 130 in one embodiment, and is increased by at least about 10% prior to being disposed within the retainer ring slot 130 in another embodiment,. Stated another way, the diameter of the tapered section 126 at its end 128a is at least about 8% greater than the diameter of the tapered section 126 at its end 128b to provide for the desired expansion of the retainer ring 102 in one embodiment, and is at least about 10% greater in another embodiment. This will then generate sufficient forces within the retainer ring 102 so as to apply sufficient forces against the outer wall 124 of the pivot bearing 118 when the retainer ring 102 is disposed within the retainer ring slot 130. Once in the retainer ring slot 130, the inner diameter of the retainer ring 102 is at least about 4% larger than when in its undeformed state.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

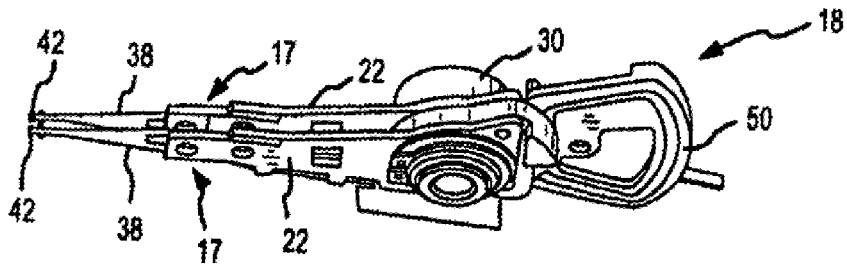

What is claimed is:

1. A disk drive head stack assembly, comprising:
   a pivot bearing comprising a rotational axis, an inner bearing member disposed about said rotational axis, and an outer bearing member disposed about said inner bearing member, wherein said outer bearing member comprises:
      a tapered portion extending between first and second locations along a length dimension of said outer bearing member, wherein said tapered portion is larger at said second location than at said first location;
      a retainer ring slot, wherein said second location is disposed between said retainer ring slot and said first location;
   a first head/arm assembly mounted on said outer bearing member of said pivot bearing;
   a retainer ring disposed within said retainer ring slot; and
   a stop associated with said outer bearing member, wherein said retainer ring slot is disposed between said tapered portion and said stop, wherein said first head/arm assembly is located between said retainer ring and said stop, and wherein said retainer ring may be positioned on said outer bearing member and advanced toward said retainer ring slot, with said retainer ring being expanded by progressing along said tapered portion prior to reaching said retainer ring slot.

2. A disk drive head stack assembly, as claimed in claim 1, wherein:
   said stop is an annular flange of said outer bearing member.

3. A disk drive head stack assembly, as claimed in claim 1, further comprising:
   a first spring disposed between said first head/arm assembly and one of said stop and said retainer ring.

4. A disk drive head stack assembly, as claimed in claim 3, wherein:
   said first spring comprises a Belleville spring.

5. A disk drive head stack assembly, as claimed in claim 1, further comprising:
   means for biasing said first head/arm assembly toward one of said stop and said retainer ring.

6. A disk drive head stack assembly, as claimed in claim 1, further comprising:
   a second head/arm assembly mounted on said outer bearing member and located between said stop and said retainer ring.

7. A disk drive head stack assembly, as claimed in claim 1, wherein:
   said tapered portion has a constant slope between said first and second locations.

8. A disk drive head stack assembly, as claimed in claim 7, wherein:
   a magnitude of said constant slope is at least about 0.3.

9. A disk drive head stack assembly, as claimed in claim 1, wherein:
   a diameter of said tapered portion is at least about 10% greater at said second location than at said first location.

10. A disk drive head stack assembly, comprising:
    a pivot bearing comprising an inner bearing member and an outer bearing member disposed about said inner bearing member, wherein said outer bearing member comprises an outer wall that in turn comprises:
       a frustum comprising first and second ends, wherein said first end is smaller than said second end; and
       a retainer ring slot;
    a stop associated with said outer bearing member, wherein said retainer ring slot is located between said frustum and said stop, and wherein said second end of said frustum is located between said retainer ring slot and said first end of said frustum;
    a retainer ring disposed in said retainer ring slot; and
    a first head/arm assembly disposed between said stop and said retainer ring, wherein said retainer ring may be positioned on said outer bearing member and advanced toward said retainer ring slot, with said retainer ring being expanded by progressing along said frustum prior to reaching said retainer ring slot.

11. A disk drive head stack assembly, as claimed in claim 10, wherein:
    said stop is an annular flange of said outer bearing member.

12. A disk drive head stack assembly, as claimed in claim 11, further comprising:
    a first spring disposed between said first head/arm assembly and one of said stop and said retainer ring.

13. A disk drive head stack assembly, as claimed in claim 12, wherein:
    said first spring comprises a Belleville spring.

14. A disk drive head stack assembly, as claimed in claim 10, further comprising:
    means for biasing said first head/arm assembly toward one of said stop and said retainer ring.

15. A disk drive head stack assembly, as claimed in claim 10, further comprising:
    a second head/arm assembly mounted on said pivot bearing at a location between said stop and said retainer ring.

16. A disk drive head stack assembly, as claimed in claimed 10, wherein:
    an effective diameter of said frustum at said second end is at least about 8% greater than an effective diameter of said frustum at said first end.

17. A disk drive head stack assembly, as claimed in claim 10, wherein:
    a magnitude of a slope of said frustum is at least about 0.3.

18. A disk drive head stack assembly, comprising:
    a pivot bearing comprising an inner bearing member and an outer bearing member disposed about said inner bearing member, wherein said outer bearing member comprises an outer wall that in turn comprises:

a retainer ring expansion section; and
a retainer ring slot;
a stop associated with said outer bearing member, wherein said retainer ring slot is located between said retainer ring expansion section and said stop;
a retainer ring disposed in said retainer ring slot; and
a first head/arm assembly disposed between said stop and said retainer ring, wherein said retainer ring may be positioned on said outer bearing member and advanced toward said retainer ring slot, with said retainer ring being expanded by progressing along said retainer ring expansion section prior to reaching said retainer ring slot.

19. A disk drive head stack assembly, comprising:
a pivot bearing comprising a rotational axis, an inner bearing member disposed about said rotational axis, and an outer bearing member disposed about said inner bearing member, wherein said outer bearing member comprises:
  a tapered portion located between first and second locations along a length dimension of said outer bearing member, wherein said tapered portion is larger at said second location than at said first location, wherein said tapered portion has a constant slope between said first and second locations, and wherein a magnitude of said constant slope is at least about 0.3;
  a retainer ring slot, wherein said second location is disposed between said retainer ring slot and said first location;
a first head/arm assembly mounted on said outer bearing member of said pivot bearing;
a retainer ring disposed within said retainer ring slot; and
a stop associated with said outer bearing member, wherein said retainer ring slot is disposed between said tapered portion and said stop, and wherein said first head/arm assembly is located between said retainer ring and said stop.

20. A disk drive head stack assembly, comprising:
a pivot bearing comprising a rotational axis, an inner bearing member disposed about said rotational axis, and an outer bearing member disposed about said inner bearing member, wherein said outer bearing member comprises:
  a tapered portion located between first and second locations along a length dimension of said outer bearing member, wherein said tapered portion is larger at said second location than at said first location, wherein a diameter of said tapered portion is at least about 10% greater at said second location than at said first location;
  a retainer ring slot, wherein said second location is disposed between said retainer ring slot and said first location;
a first head/arm assembly mounted on said outer bearing member of said pivot bearing;
a retainer ring disposed within said retainer ring slot; and
a stop associated with said outer bearing member, wherein said retainer ring slot is disposed between said tapered portion and said stop, and wherein said first head/arm assembly is located between said retainer ring and said stop.

21. A disk drive head stack assembly, comprising:
a pivot bearing comprising an inner bearing member and an outer bearing member disposed about said inner bearing member, wherein said outer bearing member comprises an outer wall that in turn comprises:
  a frustum comprising first and second ends, wherein said first end is smaller than said second end, wherein an effective diameter of said frustum at said second end is at least about 8% greater than an effective diameter of said frustum at said first end; and
  a retainer ring slot;
a stop associated with said outer bearing member, wherein said retainer ring slot is located between said frustum and said stop;
a retainer ring disposed in said retainer ring slot; and
a first head/arm assembly disposed between said stop and said retainer ring.

22. A disk drive head stack assembly, comprising:
a pivot bearing comprising an inner bearing member and an outer bearing member disposed about said inner bearing member, wherein said outer bearing member comprises an outer wall that in turn comprises:
  a frustum comprising first and second ends, wherein said first end is smaller than said second end, wherein a magnitude of a slope of said frustum is at least about 0.3; and
  a retainer ring slot;
a stop associated with said outer bearing member, wherein said retainer ring slot is located between said frustum and said stop;
a retainer ring disposed in said retainer ring slot; and
a first head/arm assembly disposed between said stop and said retainer ring.

* * * * *

UNITED STATES PATENT AND TRADEMARK OFFICE
CERTIFICATE OF CORRECTION

PATENT NO. : 6,903,903 B1
APPLICATION NO. : 10/412884
DATED : June 7, 2005
INVENTOR(S) : Fruge et al.

It is certified that error appears in the above-identified patent and that said Letters Patent is hereby corrected as shown below:

Please delete the old existing drawings and Insert these new illustrated attached drawings.

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 6,903,903 B1
APPLICATION NO. : 10/412884
DATED : June 7, 2005
INVENTOR(S) : Fruge et al.

It is certified that error appears in the above-identified patent and that said Letters Patent is hereby corrected as shown below:

Delete the title page and substitute therefor the attached title page.

Please delete the old existing drawings and Insert these new illustrated attached drawings.

This certificate supersedes the Certificate of Correction issued June 10, 2008.

Signed and Sealed this

Fifteenth Day of July, 2008

JON W. DUDAS
*Director of the United States Patent and Trademark Office*

(12) United States Patent
Fruge et al.

(10) Patent No.: US 6,903,903 B1
(45) Date of Patent: Jun. 7, 2005

(54) DISK DRIVE HEAD STACK ASSEMBLY HAVING A TAPERED PIVOT BEARING

(75) Inventors: Tave J. Fruge, Louisville, CO (US); James A. Dunckley, Boulder, CO (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 10/412,884

(22) Filed: Apr. 14, 2003

Related U.S. Application Data

(63) Continuation-in-part of application No. 09/354,400, filed on Jul. 15, 1999, now abandoned.

(51) Int. Cl.$^7$ ................................. G11B 21/08
(52) U.S. Cl. ................................. 360/265.7
(58) Field of Search .................. 360/254.6, 240, 360/265.7, 266.1, 265.6

(56) References Cited

U.S. PATENT DOCUMENTS

| | | | |
|---|---|---|---|
| 3,973,273 A | 8/1976 | Lissner et al. | 360/98 |
| 4,899,237 A | 2/1990 | Tochiyama et al. | 360/98.02 |
| 4,900,958 A | 2/1990 | Kitahara et al. | 310/67 R |
| 5,097,588 A | 3/1992 | Fird et al. | 29/603 |
| 5,143,459 A | 9/1992 | Pluft | 384/537 |
| 5,650,896 A | 7/1997 | Viskochil | 360/106 |
| 5,654,597 A | 8/1997 | Sakashita et al. | 310/51 |
| 5,666,243 A | 9/1997 | Brent | 360/265.7 |
| 5,801,901 A | 9/1998 | Bryan et al. | 360/98.08 |
| 5,999,373 A * | 12/1999 | Alisup et al. | 360/265.6 |
| 6,299,358 B1 * | 10/2001 | Prater et al. | 384/537 |

* cited by examiner

*Primary Examiner*—George J. Letscher
(74) *Attorney, Agent, or Firm*—Marsh Fischmann & Breyfogle LLP

(57) ABSTRACT

A disk drive head stack assembly (66) of a configuration that facilitates the assembly thereof is disclosed. One or more head/arm assemblies (74) are mounted on a pivot bearing (118). This pivot bearing (118) includes a tapered section (126). Each head/arm assembly (74) may be mounted on the pivot bearing (118). Thereafter, a retainer ring (102) may be advanced relative to the pivot bearing (118). Advancement of the retainer ring (102) along the tapered section (126) expands the retainer ring (102) so that the same may be disposed within a retainer ring slot (130) of the pivot bearing (118). Each head/arm assembly (74) is maintained between this retainer ring (102) and a flange (134) of the pivot bearing (118).

22 Claims, 7 Drawing Sheets